(12) United States Patent
Paluri et al.

(10) Patent No.: US 11,917,143 B2
(45) Date of Patent: Feb. 27, 2024

(54) ADAPTIVE LOOP FILTER-BASED VIDEO OR IMAGE CODING

(71) Applicant: LG ELECTRONICS INC., Seoul (KR)

(72) Inventors: Seethal Paluri, Seoul (KR); Jaehyun Lim, Seoul (KR); Seunghwan Kim, Seoul (KR); Jie Zhao, Seoul (KR)

(73) Assignee: LG Electronics Inc., Seoul (KR)

( * ) Notice: Subject to any disclaimer, the term of this patent is extended or adjusted under 35 U.S.C. 154(b) by 218 days.

(21) Appl. No.: 17/600,012

(22) PCT Filed: Mar. 19, 2020

(86) PCT No.: PCT/KR2020/003788
§ 371 (c)(1),
(2) Date: Sep. 29, 2021

(87) PCT Pub. No.: WO2020/204419
PCT Pub. Date: Oct. 8, 2020

(65) Prior Publication Data
US 2022/0182620 A1   Jun. 9, 2022

Related U.S. Application Data

(60) Provisional application No. 62/829,018, filed on Apr. 3, 2019.

(51) Int. Cl.
*H04N 19/117* (2014.01)
*H04N 19/176* (2014.01)
*H04N 19/184* (2014.01)

(52) U.S. Cl.
CPC ......... *H04N 19/117* (2014.11); *H04N 19/176* (2014.11); *H04N 19/184* (2014.11)

(58) Field of Classification Search
USPC ..................................... 375/240.12
See application file for complete search history.

(56) References Cited

U.S. PATENT DOCUMENTS

| | | | |
|---|---|---|---|
| 11,190,769 B2* | 11/2021 | Ahn ........................ | H04N 19/46 |
| 2013/0182755 A1* | 7/2013 | Chen ....................... | H04N 19/70 |
| | | | 375/240.01 |
| 2018/0041779 A1* | 2/2018 | Zhang ................... | H04N 19/117 |
| 2021/0392333 A1* | 12/2021 | Paluri ................... | H04N 19/188 |
| 2022/0109888 A1* | 4/2022 | Paluri ................... | H04N 19/105 |
| 2022/0150481 A1* | 5/2022 | Kim ........................ | H04N 19/82 |

FOREIGN PATENT DOCUMENTS

| KR | 10-2013-0034614 A | 4/2013 | |
|---|---|---|---|
| KR | 10-2013-0054377 A | 5/2013 | |
| KR | 10-2018-0019549 A | 2/2018 | |
| WO | 2013-081935 A1 | 6/2013 | |
| WO | WO-2020176636 A1 * | 9/2020 | ........... H04N 19/105 |

OTHER PUBLICATIONS

Paluri, et al., "AHG17: Conditional Signaling of ALF and In-Loop Reshaper Model" JVET-N0290, Joint Video Experts Team (JVET) of ITU-T SG 16 WP 3 and ISO/IEC JTC 1/SC 29/WG 11 14th Meeting: Geneva, CH, Mar. 12, 2019, pp. 1-4.

* cited by examiner

*Primary Examiner* — Behrooz M Senfi
(74) *Attorney, Agent, or Firm* — Bryan Cave Leighton Paisner LLP

(57) ABSTRACT

According to the disclosure of the present document, ALF parameters and/or LMCS parameters may be hierarchically signaled, thereby enabling a reduction in data volume to be signaled for video/image coding and an increase in coding efficiency.

13 Claims, 17 Drawing Sheets

(a)

(b)

ADAPTIVE LOOP FILTER-BASED VIDEO OR IMAGE CODING

CROSS-REFERENCE TO PRIOR APPLICATIONS

This application is a National Stage of PCT/KR2020/003788, filed Mar. 19, 2020, which claims priority to U.S. Provisional Application No. 62/829,018, filed on Apr. 3, 2019, the disclosures of which are incorporated herein by reference.

TECHNICAL FIELD

The present disclosure relates an image or video coding based on adaptive loop filter.

BACKGROUND

Recently, the demand for high resolution, high quality image/video such as 4K, 8K or more Ultra High Definition (UHD) image/video is increasing in various fields. As the image/video resolution or quality becomes higher, relatively more amount of information or bits are transmitted than for conventional image/video data. Therefore, if image/video data are transmitted via a medium such as an existing wired/wireless broadband line or stored in a legacy storage medium, costs for transmission and storage are readily increased.

Moreover, interests and demand are growing for virtual reality (VR) and artificial reality (AR) contents, and immersive media such as hologram; and broadcasting of images/videos exhibiting image/video characteristics different from those of an actual image/video, such as game images/videos, are also growing.

Therefore, a highly efficient image/video compression technique is required to effectively compress and transmit, store, or play high resolution, high quality images/videos showing various characteristics as described above.

In addition, there is a discussion on techniques such as luma mapping with chroma scaling (LMCS) and adaptive loop filtering (ALF) to improve compression efficiency and increase subjective/objective visual quality. In order to efficiently apply these techniques, there is a need for a method for efficiently signaling related information.

SUMMARY

According to an embodiment of the present document, a method and an apparatus which increase image coding efficiency are provided.

According to an embodiment of the present document, an efficient filtering applying method and apparatus are provided.

According to an embodiment of the present document, an efficient LMCS application method and apparatus are provided.

According to an embodiment of the present document, a method and an apparatus for hierarchically signaling ALF-related information are provided.

According to an embodiment of the present document, a method and an apparatus for hierarchically signaling LMCS-related information are provided.

According to an embodiment of the present document, ALF data may be signaled through APS, and APS ID information indicating the ID related to the referenced APS may be signaled through header information (picture header or slice header).

According to an embodiment of the present document, information about the number of APS IDs related to ALF may be signaled through header information. In this case, the header information may include as many APS ID syntax elements as the number of the APS IDs related to ALF and based on this, it is possible to support derivation of adaptive filters (filter coefficients) in units of blocks/subblocks within the same picture or the same slice and applying ALF.

According to an embodiment of the present document, LMCS data may be signaled through APS, and APS ID information indicating the ID of the referenced APS may be signaled through header information (picture header or slice header).

According to an embodiment of the present document, a video/image decoding method performed by a decoding apparatus is provided.

According to an embodiment of the present document, a decoding apparatus for performing video/image decoding is provided.

According to an embodiment of the present document, a video/image encoding method performed by an encoding apparatus is provided.

According to an embodiment of the present document, an encoding apparatus for performing video/image encoding is provided.

According to an embodiment of the present document, a computer-readable digital storage medium storing encoded video/image information generated according to the video/image encoding method disclosed in at least one of the embodiments of this document is provided.

According to an embodiment of the present document, a computer-readable digital storage medium storing encoded information or encoded video/image information causing a decoding apparatus to perform the video/image decoding method disclosed in at least one of the embodiments of this document is provided.

According to the present disclosure, it is possible to increase overall image/video compression efficiency.

According to the present disclosure, through efficient filtering, subjective/objective visual quality can be improved.

According to the present disclosure, ALF and/or LMCS may be adaptively applied in units of pictures, slices, and/or coding blocks.

According to the present disclosure, information related to ALF can be efficiently signaled.

According to the present disclosure, information related to LMCS can be efficiently signaled.

DESCRIPTION OF EXEMPLARY EMBODIMENTS

Figure 1:
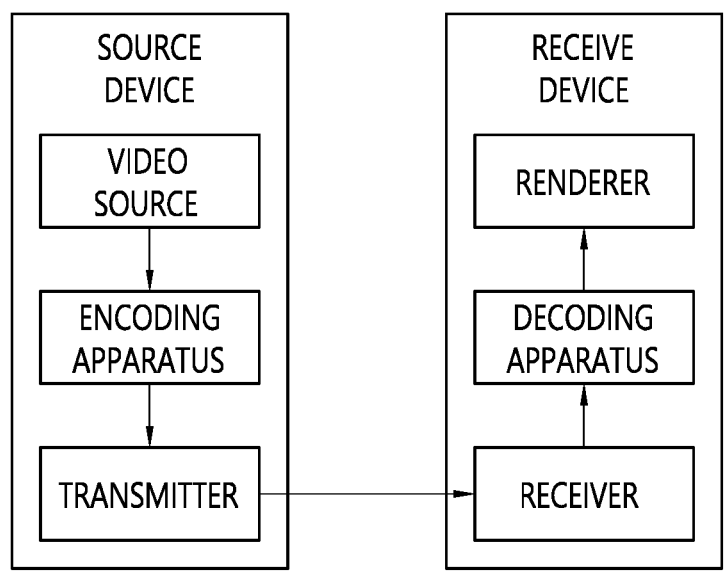
FIG. 1 schematically represents an example of a video/image coding system to which embodiments of the present disclosure may be applied.

The disclosure of the present document may be modified in various forms, and specific embodiments thereof will be described and illustrated in the drawings. However, the embodiments are not intended for limiting the present disclosure. The terms used in the document are used to merely describe specific embodiments, but are not intended to limit the embodiment of the present document. An expression of a singular number includes an expression of the plural number, so long as it is clearly read differently. The terms such as "include" and "have" are intended to indicate that features, numbers, steps, operations, elements, components, or combinations thereof used in the document exist and it should be thus understood that the possibility of existence or addition of one or more different features, numbers, steps, operations, elements, components, or combinations thereof is not excluded.

In addition, each configuration of the drawings described in the present document is an independent illustration for explaining functions as features that are different from each other, and does not mean that each configuration is implemented by mutually different hardware or different software. For example, two or more of the configurations can be combined to form one configuration, and one configuration can also be divided into multiple configurations. Without departing from the gist of the present disclosure, embodiments in which configurations are combined and/or separated are included in the scope of the disclosure of the present document.

Hereinafter, embodiments of the present document will be described in detail with reference to the accompanying drawings. In addition, like reference numerals may be used to indicate like elements throughout the drawings, and the same descriptions on the like elements will be omitted.

FIG. 1 illustrates an example of a video/image coding system to which the embodiments of the present document may be applied.

Referring to FIG. 1, a video/image coding system may include a source device and a reception device. The source device may transmit encoded video/image information or data to the reception device through a digital storage medium or network in the form of a file or streaming.

The source device may include a video source, an encoding apparatus, and a transmitter. The receiving device may include a receiver, a decoding apparatus, and a renderer. The encoding apparatus may be called a video/image encoding apparatus, and the decoding apparatus may be called a video/image decoding apparatus. The transmitter may be included in the encoding apparatus. The receiver may be included in the decoding apparatus. The renderer may include a display, and the display may be configured as a separate device or an external component.

The video source may acquire video/image through a process of capturing, synthesizing, or generating the video/image. The video source may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding apparatus may encode input video/image. The encoding apparatus may perform a series of procedures such as prediction, transform, and quantization for compaction and coding efficiency. The encoded data (encoded video/image information) may be output in the form of a bitstream.

The transmitter may transmit the encoded image/image information or data output in the form of a bitstream to the receiver of the receiving device through a digital storage medium or a network in the form of a file or streaming. The digital storage medium may include various storage mediums such as USB, SD, CD, DVD, Blu-ray, HDD, SSD, and the like. The transmitter may include an element for generating a media file through a predetermined file format and may include an element for transmission through a broadcast/communication network. The receiver may receive/extract the bitstream and transmit the received bitstream to the decoding apparatus.

The decoding apparatus may decode the video/image by performing a series of procedures such as dequantization, inverse transform, and prediction corresponding to the operation of the encoding apparatus.

The renderer may render the decoded video/image. The rendered video/image may be displayed through the display.

The present document relates to video/image coding. For example, a method/embodiment disclosed in the present document may be applied to a method disclosed in the versatile video coding (VVC) standard. In addition, a method/embodiment disclosed in the present document may be applied to a method disclosed in the essential video coding (EVC) standard, the AOMedia Video 1 (AV1) standard, the 2nd generation of audio video coding standard (AVS2) or the next generation video/image coding standard (e.g., H.267, H.268, or the like).

The present disclosure suggests various embodiments of video/image coding, and the above embodiments may also be performed in combination with each other unless otherwise specified.

In the present disclosure, a video may refer to a series of images over time. A picture generally refers to the unit representing one image at a particular time frame, and a slice/tile refers to the unit constituting a part of the picture in terms of coding. A slice/tile may include one or more coding tree units (CTUs). One picture may consist of one or more slices/tiles. A tile is a rectangular region of CTUs within a particular tile column and a particular tile row in a picture (A tile is a rectangular region of CTUs within a particular tile column and a particular tile row in a picture). The tile column is a rectangular region of CTUs, which has a height equal to the height of the picture and a width that may be specified by syntax elements in the picture parameter set (The tile column is a rectangular region of CTUs having a height equal to the height of the picture and a width specified by syntax elements in the picture parameter set). The tile row is a rectangular region of CTUs, which has a width specified by syntax elements in the picture parameter set and a height that may be equal to the height of the picture (The tile row is a rectangular region of CTUs having a height specified by syntax elements in the picture parameter set and a width equal to the width of the picture). A tile scan may represent a specific sequential ordering of CTUs partitioning a picture, and the CTUs may be ordered consecutively in a CTU raster scan in a tile, and tiles in a picture may be ordered consecutively in a raster scan of the tiles of the picture (A tile scan is a specific sequential ordering of CTUs partitioning a picture in which the CTUs are ordered consecutively in CTU raster scan in a tile whereas tiles in a picture are ordered consecutively in a raster scan of the tiles of the picture). A slice includes an integer number of complete tiles or an integer number of consecutive complete CTU rows within a tile of a picture that may be exclusively contained in a single NAL unit.

Meanwhile, one picture may be divided into two or more subpictures. A subpicture may be a rectangular region of one or more slices within a picture.

A pixel or a pel may mean a smallest unit constituting one picture (or image). Also, 'sample' may be used as a term corresponding to a pixel. A sample may generally represent a pixel or a value of a pixel, and may represent only a pixel/pixel value of a luma component or only a pixel/pixel value of a chroma component.

A unit may represent a basic unit of image processing. The unit may include at least one of a specific region of the picture and information related to the region. One unit may include one luma block and two chroma (ex. cb, cr) blocks. The unit may be used interchangeably with terms such as block or area in some cases. In a general case, an M×N block may include samples (or sample arrays) or a set (or array) of transform coefficients of M columns and N rows.

In this document, "A or B" may mean "only A", "only B" or "both A and B". In other words, "A or B" in this document may be interpreted as "A and/or B". For example, in this document "A, B or C" means "only A", "only B", "only C", or "any combination of A, B and C".

A slash (/) or comma (,) used in this document may mean "and/or". For example, "A/B" may mean "A and/or B". Accordingly, "A/B" may mean "only A", "only B", or "both A and B". For example, "A, B, C" may mean "A, B, or C".

In this document, "at least one of A and B" may mean "only A", "only B" or "both A and B". Also, in this document, the expression "at least one of A or B" or "at least one of A and/or B" means "at least one. It can be interpreted the same as "at least one of A and B".

Also, in this document, "at least one of A, B and C" means "only A", "only B", "only C", or "A, B and C" Any combination of A, B and C". Also, "at least one of A, B or C" or "at least one of A, B and/or C" means may mean "at least one of A, B and C".

Also, parentheses used in this document may mean "for example". Specifically, when "prediction (intra prediction)" is indicated, "intra prediction" may be proposed as an example of "prediction". In other words, "prediction" in this document is not limited to "intra prediction", and "intra prediction" may be proposed as an example of "prediction". Also, even when "prediction (ie, intra prediction)" is indicated, "intra prediction" may be proposed as an example of "prediction".

Technical features that are individually described in one drawing in this document may be implemented individually or may be implemented at the same time.

Figure 2:
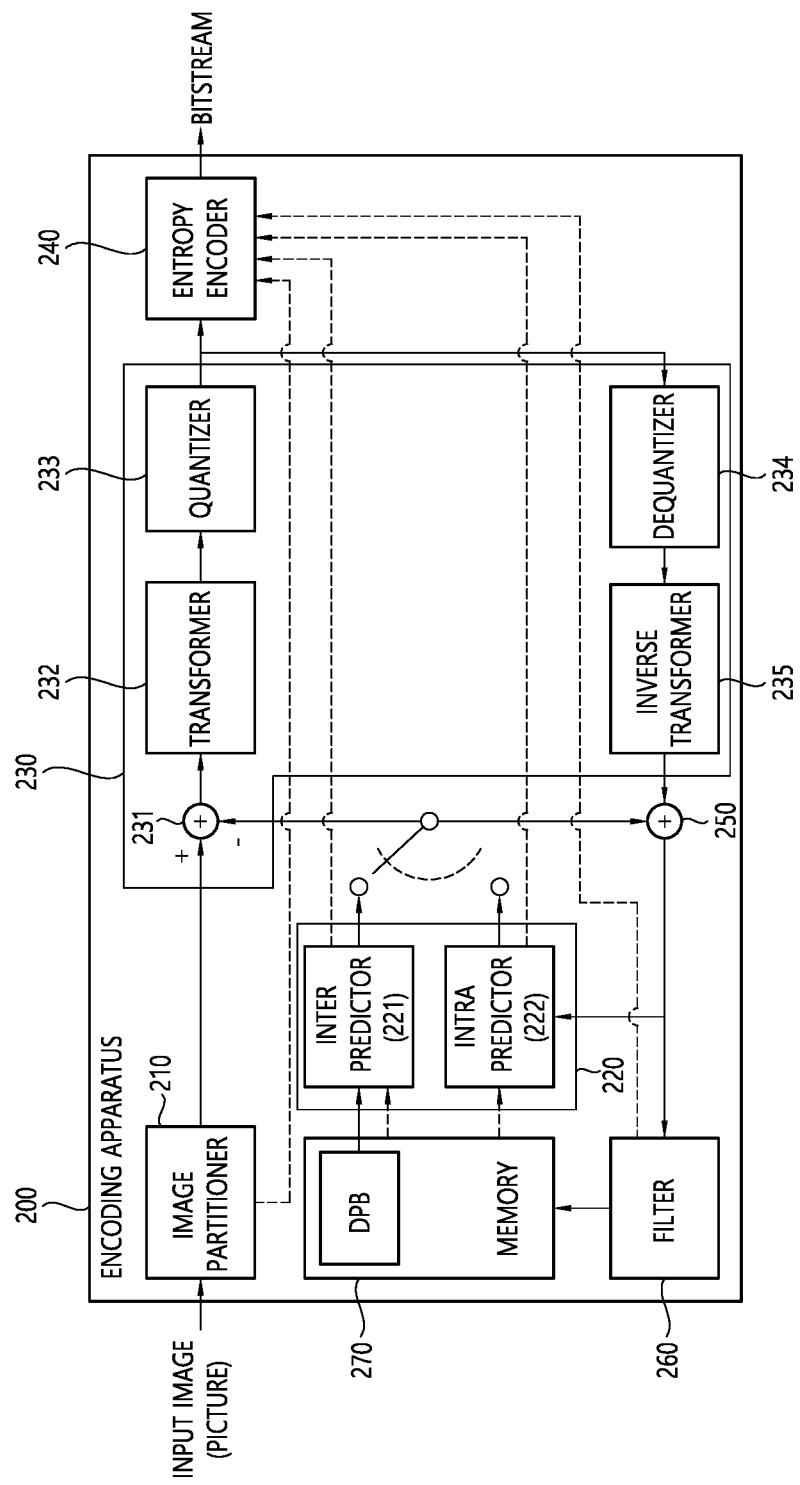
FIG. 2 is a diagram schematically describing a configuration of a video/image encoding apparatus to which embodiments of the present disclosure may be applied.

FIG. 2 is a diagram schematically illustrating a configuration of a video/image encoding apparatus to which the embodiments of the present disclosure may be applied. Hereinafter, what is referred to as the encoding apparatus may include an image encoding apparatus and/or a video encoding apparatus.

Referring to FIG. 2, the encoding apparatus 200 may include and be configured with an image partitioner 210, a predictor 220, a residual processor 230, an entropy encoder 240, an adder 250, a filter 260, and a memory 270. The predictor 220 may include an inter predictor 221 and an intra predictor 222. The residual processor 230 may include a transformer 232, a quantizer 233, a dequantizer 234, and an inverse transformer 235. The residual processor 230 may further include a subtractor 231. The adder 250 may be called a reconstructor or reconstructed block generator. The image partitioner 210, the predictor 220, the residual processor 230, the entropy encoder 240, the adder 250, and the filter 260, which have been described above, may be configured by one or more hardware components (e.g., encoder chipsets or processors) according to an embodiment. In addition, the memory 270 may include a decoded picture buffer (DPB), and may also be configured by a digital storage medium. The hardware component may further include the memory 270 as an internal/external component.

The image partitioner 210 may split an input image (or, picture, frame) input to the encoding apparatus 200 into one or more processing units. As an example, the processing unit may be called a coding unit (CU). In this case, the coding unit may be recursively split according to a Quad-tree binary-tree ternary-tree (QTBTTT) structure from a coding tree unit (CTU) or the largest coding unit (LCU). For example, one coding unit may be split into a plurality of coding units of a deeper depth based on a quad-tree structure, a binary-tree structure, and/or a ternary-tree structure. In this case, for example, the quad-tree structure is first applied and the binary-tree structure and/or the ternary-tree structure may be later applied. Alternatively, the binary-tree structure may also be first applied. A coding procedure according to the present document may be performed based on a final coding unit which is not split any more. In this case, based on coding efficiency according to image characteristics or the like, the maximum coding unit may be directly used as the final coding unit, or as necessary, the coding unit may be recursively split into coding units of a deeper depth, such that a coding unit having an optimal size may be used as the final coding unit. Here, the coding procedure may include a procedure such as prediction, transform, and reconstruction to be described later. As another example, the processing unit may further include a prediction unit (PU) or a transform unit (TU). In this case, each of the prediction unit and the transform unit may be split or partitioned from the aforementioned final coding unit. The prediction unit may be a unit of sample prediction, and the transform unit may be a unit for inducing a transform coefficient and/or a unit for inducing a residual signal from the transform coefficient.

The unit may be interchangeably used with the term such as a block or an area in some cases. Generally, an M×N block may represent samples composed of M columns and N rows or a group of transform coefficients. The sample may generally represent a pixel or a value of the pixel, and may also represent only the pixel/pixel value of a luma component, and also represent only the pixel/pixel value of a chroma component. The sample may be used as the term corresponding to a pixel or a pel configuring one picture (or image).

The encoding apparatus 200 may generate a residual signal (residual block, residual sample array) by subtracting a predicted signal (predicted block, prediction sample array) output from the inter predictor 221 or the intra predictor 222 from the input image signal (original block, original sample array), and the generated residual signal is transmitted to the transformer 232. In this case, as illustrated, the unit for subtracting the predicted signal (predicted block, prediction sample array) from the input image signal (original block, original sample array) within an encoder 200 may be called the subtractor 231. The predictor may perform prediction for a block to be processed (hereinafter, referred to as a current block), and generate a predicted block including prediction samples of the current block. The predictor may determine whether intra prediction is applied or inter prediction is applied in units of the current block or the CU. The predictor may generate various information about prediction, such as prediction mode information, to transfer the generated information to the entropy encoder 240 as described later in the description of each prediction mode. The information about prediction may be encoded by the entropy encoder 240 to be output in a form of the bitstream.

The intra predictor 222 may predict a current block with reference to samples within a current picture. The referenced samples may be located neighboring to the current block, or may also be located away from the current block according to the prediction mode. The prediction modes in the intra prediction may include a plurality of non-directional modes and a plurality of directional modes. The non-directional mode may include, for example, a DC mode or a planar mode. The directional mode may include, for example, 33 directional prediction modes or 65 directional prediction modes according to the fine degree of the prediction direction. However, this is illustrative and the directional prediction modes which are more or less than the above number may be used according to the setting. The intra predictor 222 may also determine the prediction mode applied to the current block using the prediction mode applied to the neighboring block.

The inter predictor 221 may induce a predicted block of the current block based on a reference block (reference sample array) specified by a motion vector on a reference picture. At this time, in order to decrease the amount of motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. The reference picture including the reference block and the reference picture including the temporal neighboring block may also be the same as each other, and may also be different from each other. The temporal neighboring block may be called the name such as a collocated reference block, a collocated CU (colCU), or the like, and the reference picture including the temporal neighboring block may also be called a collocated picture (colPic). For example, the inter predictor 221 may configure a motion information candidate list based on the neighboring blocks, and generate information indicating what candidate is used to derive the motion vector and/or the reference picture index of the current block. The inter prediction may be performed based on various prediction modes, and for example, in the case of a skip mode and a merge mode, the inter predictor 221 may use the motion information of the neighboring block as the motion information of the current block. In the case of the skip mode, the residual signal may not be transmitted unlike the merge mode. A motion vector prediction (MVP) mode may indicate the motion vector of the current block by using the motion vector of the neighboring block as a motion vector predictor, and signaling a motion vector difference.

The predictor 200 may generate a predicted signal based on various prediction methods to be described later. For example, the predictor may not only apply the intra prediction or the inter prediction for predicting one block, but also simultaneously apply the intra prediction and the inter prediction. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, a sample value in a picture may be signaled based on information on a palette index and a palette table.

The predicted signal generated through the predictor (including the inter predictor 221 and/or the intra predictor 222) may be used to generate a reconstructed signal or used to generate a residual signal. The transformer 232 may generate transform coefficients by applying the transform technique to the residual signal. For example, the transform technique may include at least one of a discrete cosine transform (DCT), a discrete sine transform (DST), a graph-based transform (GBT), or a conditionally non-linear transform (CNT). Here, when the relationship information between pixels is illustrated as a graph, the GBT means the transform obtained from the graph. The CNT means the transform which is acquired based on a predicted signal generated by using all previously reconstructed pixels. In addition, the transform process may also be applied to a pixel block having the same size of the square, and may also be applied to the block having a variable size rather than the square.

The quantizer 233 may quantize the transform coefficients to transmit the quantized transform coefficients to the entropy encoder 240, and the entropy encoder 240 may encode the quantized signal (information about the quantized transform coefficients) to the encoded quantized signal to the bitstream. The information about the quantized transform coefficients may be called residual information. The quantizer 233 may rearrange the quantized transform coefficients having a block form in a one-dimensional vector form based on a coefficient scan order, and also generate the information about the quantized transform coefficients based on the quantized transform coefficients of the one dimensional vector form. The entropy encoder 240 may perform various encoding methods, for example, such as an exponential Golomb coding, a context-adaptive variable length coding (CAVLC), and a context-adaptive binary arithmetic coding (CABAC). The entropy encoder 240 may also encode information (e.g., values of syntax elements and the like) necessary for reconstructing video/image other than the quantized transform coefficients together or separately. The encoded information (e.g., encoded video/image information) may be transmitted or stored in units of network abstraction layer (NAL) unit in a form of the bitstream. The video/image information may further include information about various parameter sets such as an adaptation parameter set (APS), a picture parameter set (PPS), a sequence parameter set (SPS), or a video parameter set (VPS). In addition, the video/image information may further include general constraint information. The signaled/transmitted information and/or syntax elements to be described later in the present disclosure may be encoded through the aforementioned encoding procedure and thus included in the bitstream. The bitstream may be transmitted through a network, or stored in a digital storage medium. Here, the network may include a broadcasting network and/or a communication network, or the like, and the digital storage medium may include various storage media such as USB, SD, CD, DVD, Blue-ray, HDD, and SSD. A transmitter (not illustrated) for transmitting the signal output from the entropy encoder 240 and/or a storage (not illustrated) for storing the signal may be configured as the internal/external elements of the encoding apparatus 200, or the transmitter may also be included in the entropy encoder 240.

The quantized transform coefficients output from the quantizer 233 may be used to generate a predicted signal. For example, the dequantizer 234 and the inverse transformer 235 apply dequantization and inverse transform to the quantized transform coefficients, such that the residual signal (residual block or residual samples) may be reconstructed. The adder 250 adds the reconstructed residual signal to the predicted signal output from the inter predictor 221 or the intra predictor 222, such that the reconstructed signal (reconstructed picture, reconstructed block, reconstructed sample array) may be generated. As in the case where the skip mode is applied, if there is no residual for the block to be processed, the predicted block may be used as the reconstructed block. The adder 250 may be called a reconstructor or a reconstructed block generator. The generated reconstructed signal may be used for the intra prediction of the next block to be processed within the current picture, and as described later, also used for the inter prediction of the next picture through filtering.

Meanwhile, a luma mapping with chroma scaling (LMCS) may also be applied in a picture encoding and/or reconstruction process.

The filter 260 may apply filtering to the reconstructed signal, thereby improving subjective/objective image qualities. For example, the filter 260 may apply various filtering methods to the reconstructed picture to generate a modified reconstructed picture, and store the modified reconstructed picture in the memory 270, specifically, the DPB of the memory 270. Various filtering methods may include, for example, a deblocking filtering, a sample adaptive offset, an adaptive loop filter, a bilateral filter, and the like. The filter 260 may generate various kinds of filtering-related information to transfer the generated information to the entropy encoder 240, as described later in the description of each filtering method. The filtering-related information may be encoded by the entropy encoder 240 to be output in a form of the bitstream.

The modified reconstructed picture transmitted to the memory 270 may be used as the reference picture in the inter predictor 221. If the inter prediction is applied by the inter predictor, the encoding apparatus may avoid the prediction mismatch between the encoding apparatus 200 and the decoding apparatus, and also improve coding efficiency.

The DPB of the memory 270 may store the modified reconstructed picture to be used as the reference picture in the inter predictor 221. The memory 270 may store motion information of the block in which the motion information within the current picture is derived (or encoded) and/or motion information of the blocks within the previously reconstructed picture. The stored motion information may be transferred to the inter predictor 221 to be utilized as motion information of the spatial neighboring block or motion information of the temporal neighboring block. The memory 270 may store the reconstructed samples of the reconstructed blocks within the current picture, and transfer the reconstructed samples to the intra predictor 222.

Figure 3:
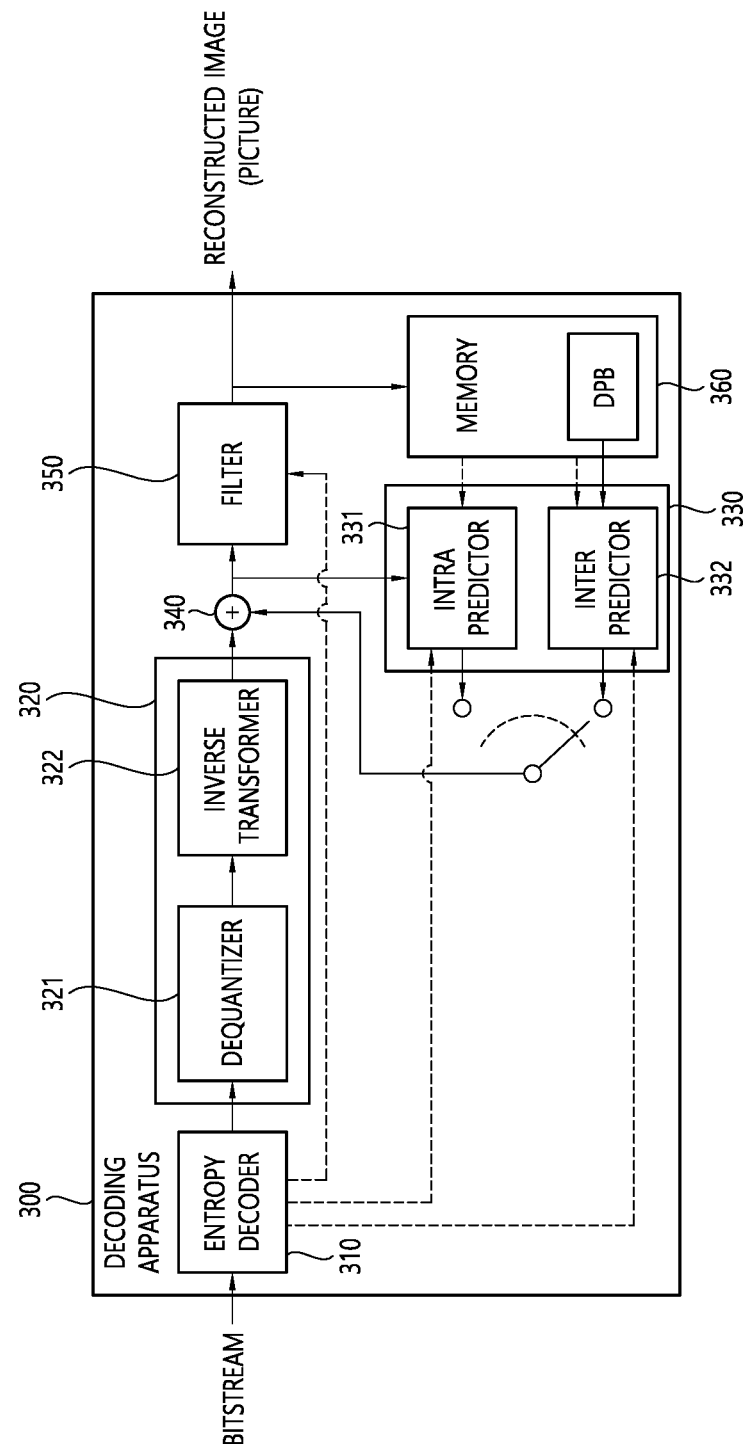
FIG. 3 is a diagram schematically describing a configuration of a video/image decoding apparatus to which embodiments of the present disclosure may be applied.

FIG. 3 is a diagram for schematically explaining a configuration of a video/image decoding apparatus to which the embodiments of the present disclosure may be applied. Hereinafter, what is referred to as the decoding apparatus may include an image decoding apparatus and/or a video decoding apparatus.

Referring to FIG. 3, the decoding apparatus 300 may include and configured with an entropy decoder 310, a residual processor 320, a predictor 330, an adder 340, a filter 350, and a memory 360. The predictor 330 may include an inter predictor 331 and an intra predictor 332. The residual processor 320 may include a dequantizer 321 and an inverse transformer 322. The entropy decoder 310, the residual processor 320, the predictor 330, the adder 340, and the filter 350, which have been described above, may be configured by one or more hardware components (e.g., decoder chipsets or processors) according to an embodiment. Further, the memory 360 may include a decoded picture buffer (DPB), and may be configured by a digital storage medium. The hardware component may further include the memory 360 as an internal/external component.

When the bitstream including the video/image information is input, the decoding apparatus 300 may reconstruct the image in response to a process in which the video/image information is processed in the encoding apparatus illustrated in FIG. 2. For example, the decoding apparatus 300 may derive the units/blocks based on block split-related information acquired from the bitstream. The decoding apparatus 300 may perform decoding using the processing unit applied to the encoding apparatus. Therefore, the processing unit for the decoding may be, for example, a coding unit, and the coding unit may be split according to the quad-tree structure, the binary-tree structure, and/or the ternary-tree structure from the coding tree unit or the maximum coding unit. One or more transform units may be derived from the coding unit. In addition, the reconstructed image signal decoded and output through the decoding apparatus 300 may be reproduced through a reproducing apparatus.

The decoding apparatus 300 may receive the signal output from the encoding apparatus illustrated in FIG. 2 in a form of the bitstream, and the received signal may be decoded through the entropy decoder 310. For example, the entropy decoder 310 may derive information (e.g., video/image information) necessary for the image reconstruction (or picture reconstruction) by parsing the bitstream. The video/image information may further include information about various parameter sets such as an adaptation parameter set (APS), a picture parameter set (PPS), a sequence parameter set (SPS), and a video parameter set (VPS). In addition, the video/image information may further include general constraint information. The decoding apparatus may decode the picture further based on the information about the parameter set and/or the general constraint information. The signaled/received information and/or syntax elements to be described later in the present disclosure may be decoded through the decoding procedure and acquired from the bitstream. For example, the entropy decoder 310 may decode information within the bitstream based on a coding method such as an exponential Golomb coding, a CAVLC, or a CABAC, and output a value of the syntax element necessary for the image reconstruction, and the quantized values of the residual-related transform coefficient. More specifically, the CABAC entropy decoding method may receive a bin corresponding to each syntax element from the bitstream, determine a context model using syntax element information to be decoded and decoding information of the neighboring block and the block to be decoded or information of the symbol/bin decoded in the previous stage, and generate a symbol corresponding to a value of each syntax element by predicting the probability of generation of the bin according to the determined context model to perform the arithmetic decoding of the bin. At this time, the CABAC entropy decoding method may determine the context model and then update the context model using the information of the decoded symbol/bin for a context model of a next symbol/bin. The information about prediction among the information decoded by the entropy decoder 310 may be provided to the predictor (the inter predictor 332 and the intra predictor 331), and a residual value at which the entropy decoding is performed by the entropy decoder 310, that is, the quantized transform coefficients and the related parameter information may be input to the residual processor 320. The residual processor 320 may derive a residual signal (residual block, residual samples, and residual sample array). In addition, the information about filtering among the information decoded by the entropy decoder 310 may be provided to the filter 350. Meanwhile, a receiver (not illustrated) for receiving the signal output from the encoding apparatus may be further configured as the internal/external element of the decoding apparatus 300, or the receiver may also be a component of the entropy decoder 310. Meanwhile, the decoding apparatus according to the present disclosure may be called a video/image/picture decoding apparatus, and the decoding apparatus may also be classified into an information decoder (video/image/picture information decoder) and a sample decoder (video/image/picture sample decoder). The information decoder may include the entropy decoder 310, and the sample decoder may include at least one of the dequantizer 321, the inverse transformer 322, the adder 340, the filter 350, the memory 360, the inter predictor 332, and the intra predictor 331.

The dequantizer 321 may dequantize the quantized transform coefficients to output the transform coefficients. The dequantizer 321 may rearrange the quantized transform coefficients in a two-dimensional block form. In this case, the rearrangement may be performed based on a coefficient scan order performed by the encoding apparatus. The dequantizer 321 may perform dequantization for the quantized transform coefficients using a quantization parameter (e.g., quantization step size information), and acquire the transform coefficients.

The inverse transformer 322 inversely transforms the transform coefficients to acquire the residual signal (residual block, residual sample array).

The predictor 330 may perform the prediction of the current block, and generate a predicted block including the prediction samples of the current block. The predictor may determine whether the intra prediction is applied or the inter prediction is applied to the current block based on the information about prediction output from the entropy decoder 310, and determine a specific intra/inter prediction mode.

The predictor may generate the predicted signal based on various prediction methods to be described later. For example, the predictor may not only apply the intra prediction or the inter prediction for the prediction of one block, but also apply the intra prediction and the inter prediction at the same time. This may be called a combined inter and intra prediction (CIIP). Further, the predictor may be based on an intra block copy (IBC) prediction mode, or a palette mode in order to perform prediction on a block. The IBC prediction mode or palette mode may be used for content image/video coding of a game or the like, such as screen content coding (SCC). The IBC basically performs prediction in a current picture, but it may be performed similarly to inter prediction in that it derives a reference block in a current picture. That is, the IBC may use at least one of inter prediction techniques described in the present document. The palette mode may be regarded as an example of intra coding or intra prediction. When the palette mode is applied, information on a palette table and a palette index may be included in the video/image information and signaled.

The intra predictor 331 may predict the current block with reference to the samples within the current picture. The referenced samples may be located neighboring to the current block according to the prediction mode, or may also be located away from the current block. The prediction modes in the intra prediction may include a plurality of non-directional modes and a plurality of directional modes. The intra predictor 331 may also determine the prediction mode applied to the current block using the prediction mode applied to the neighboring block.

The inter predictor 332 may induce the predicted block of the current block based on the reference block (reference sample array) specified by the motion vector on the reference picture. At this time, in order to decrease the amount of the motion information transmitted in the inter prediction mode, the motion information may be predicted in units of a block, a sub-block, or a sample based on the correlation of the motion information between the neighboring block and the current block. The motion information may include a motion vector and a reference picture index. The motion information may further include inter prediction direction (L0 prediction, L1 prediction, Bi prediction, or the like) information. In the case of the inter prediction, the neighboring block may include a spatial neighboring block existing within the current picture and a temporal neighboring block existing in the reference picture. For example, the inter predictor 332 may configure a motion information candidate list based on the neighboring blocks, and derive the motion vector and/or the reference picture index of the current block based on received candidate selection information. The inter prediction may be performed based on various prediction modes, and the information about the prediction may include information indicating the mode of the inter prediction of the current block.

The adder 340 may add the acquired residual signal to the predicted signal (predicted block, prediction sample array) output from the predictor (including the inter predictor 332 and/or the intra predictor 331) to generate the reconstructed signal (reconstructed picture, reconstructed block, reconstructed sample array). As in the case where the skip mode is applied, if there is no residual for the block to be processed, the predicted block may be used as the reconstructed block.

The adder 340 may be called a reconstructor or a reconstructed block generator. The generated reconstructed signal may be used for the intra prediction of a next block to be processed within the current picture, and as described later, may also be output through filtering or may also be used for the inter prediction of a next picture.

Meanwhile, a luma mapping with chroma scaling (LMCS) may also be applied in the picture decoding process.

The filter 350 may apply filtering to the reconstructed signal, thereby improving the subjective/objective image qualities. For example, the filter 350 may apply various filtering methods to the reconstructed picture to generate a modified reconstructed picture, and transmit the modified reconstructed picture to the memory 360, specifically, the DPB of the memory 360. Various filtering methods may include, for example, a deblocking filtering, a sample adaptive offset, an adaptive loop filter, a bidirectional filter, and the like.

The (modified) reconstructed picture stored in the DPB of the memory 360 may be used as the reference picture in the inter predictor 332. The memory 360 may store motion information of the block in which the motion information within the current picture is derived (decoded) and/or motion information of the blocks within the previously reconstructed picture. The stored motion information may be transferred to the inter predictor 260 to be utilized as motion information of the spatial neighboring block or motion information of the temporal neighboring block. The memory 360 may store the reconstructed samples of the reconstructed blocks within the current picture, and transfer the stored reconstructed samples to the intra predictor 331.

In the present document, the exemplary embodiments described in the filter 260, the inter predictor 221, and the intra predictor 222 of the encoding apparatus 200 may be applied equally to or to correspond to the filter 350, the inter predictor 332, and the intra predictor 331 of the decoding apparatus 300, respectively.

Meanwhile, as described above, in performing video coding, prediction is performed to improve compression efficiency. Through this, a predicted block including prediction samples for a current block as a block to be coded (i.e., a coding target block) may be generated. Here, the predicted block includes prediction samples in a spatial domain (or pixel domain). The predicted block is derived in the same manner in an encoding apparatus and a decoding apparatus, and the encoding apparatus may signal information (residual information) on residual between the original block and the predicted block, rather than an original sample value of an original block, to the decoding apparatus, thereby increasing image coding efficiency. The decoding apparatus may derive a residual block including residual samples based on the residual information, add the residual block and the predicted block to generate reconstructed blocks including reconstructed samples, and generate a reconstructed picture including the reconstructed blocks.

The residual information may be generated through a transform and quantization procedure. For example, the encoding apparatus may derive a residual block between the original block and the predicted block, perform a transform procedure on residual samples (residual sample array) included in the residual block to derive transform coefficients, perform a quantization procedure on the transform coefficients to derive quantized transform coefficients, and signal related residual information to the decoding apparatus (through a bit stream). Here, the residual information may include value information of the quantized transform coefficients, location information, a transform technique, a transform kernel, a quantization parameter, and the like. The decoding apparatus may perform dequantization/inverse transform procedure based on the residual information and derive residual samples (or residual blocks). The decoding apparatus may generate a reconstructed picture based on the predicted block and the residual block. Also, for reference for inter prediction of a picture afterward, the encoding apparatus may also dequantize/inverse-transform the quantized transform coefficients to derive a residual block and generate a reconstructed picture based thereon.

The intra prediction may indicate prediction that generates prediction samples for the current block based on reference samples in a picture to which the current block belongs (hereinafter, referred to as a current picture). When the intra prediction is applied to the current block, neighboring reference samples to be used for the intra prediction of the current block may be derived. The neighboring reference samples of the current block may include a total of 2×nH samples which are samples adjacent to the left boundary and samples neighboring to the bottom-left of the current block of size nW×nH, a total of 2×nW samples which are samples adjacent to the top boundary of the current block and samples neighboring the top-right of the current block, and one sample neighboring the top-left of the current block. Alternatively, the neighboring reference samples of the current block may include top neighboring samples of a plurality of columns and left neighboring samples of a plurality of rows. In addition, the neighboring reference samples of the current block may include a total of nH samples adjacent to the right boundary of the current block of size nW×nH, a total of nW samples adjacent to the bottom boundary of the current block, and one sample neighboring the bottom-right of the current block.

However, some of the neighboring reference samples of the current block have not yet been decoded or may not be available. In this case, the decoding apparatus may construct the neighboring reference samples to be used for prediction by substituting unavailable samples with available samples. Alternatively, the neighboring reference samples to be used for prediction may be configured through interpolation of available samples.

When the neighboring reference samples are derived, (i) a prediction sample can be derived based on the average or interpolation of the neighboring reference samples of the current block, and (ii) a prediction sample may be derived based on a reference sample existing in a specific (prediction) direction with respect to the prediction sample among neighboring reference samples of the current block. The case of (i) may be called a non-directional mode or a non-angular mode, and the case of (ii) may be called a directional mode or an angular mode.

In addition, the prediction sample may be generated through interpolation of a first neighboring sample located in the prediction direction of the intra prediction mode of the current block, based on the prediction sample of the current block, and a second neighboring sample located in a direction opposite to the prediction direction, among the neighboring reference samples. The above-described case may be referred to as linear interpolation intra prediction (LIP). In addition, chroma prediction samples may be generated based on the luma samples using a linear model. This case may be called LM mode.

In addition, a temporary prediction sample of the current block is derived based on the filtered neighboring reference samples, and the prediction sample of the current block can also be derived by weighted summing the temporary prediction sample and at least one reference sample derived according to the intra prediction mode among the existing neighboring reference samples, that is, unfiltered neighboring reference samples. The above-described case may be referred to as position dependent intra prediction (PDPC).

In addition, the reference sample line with the highest prediction accuracy is selected among multiple reference sample lines surrounding the current block, and the prediction sample is derived using the reference sample located in the prediction direction in the selected reference sample line, and intra prediction encoding may be performed by instructing (signaling) the used reference sample line to the decoding apparatus. The above-described case may be referred to as multi-reference line intra prediction or MRL-based intra prediction.

In addition, the current block is divided into vertical or horizontal sub-partitions to perform intra prediction based on the same intra prediction mode, but neighboring reference samples may be derived and used in units of the sub-partitions. That is, in this case, the intra prediction mode for the current block is equally applied to the sub-partitions, but the intra prediction performance may be improved in some cases by deriving and using the neighboring reference samples in units of the sub-partitions. Such a prediction method may be called intra-prediction based on intra sub-partitions (ISP).

The above-described intra prediction methods may be called an intra prediction type to be distinguished from the intra prediction mode. The intra prediction type may be referred to by various terms such as an intra prediction technique or an additional intra prediction mode. For example, the intra prediction type (or additional intra prediction mode, etc.) may include at least one of the aforementioned LIP, PDPC, MRL, and ISP. A general intra prediction method excluding a specific intra prediction type such as LIP, PDPC, MRL, and ISP may be referred to as a normal intra prediction type. The normal intra prediction type may be generally applied when the above specific intra prediction type is not applied, and the prediction may be performed based on the above-described intra prediction mode. Meanwhile, if necessary, post-processing filtering may be performed on the derived prediction sample.

Specifically, the intra prediction process may include an intra prediction mode/type determination step, neighboring reference samples derivation step, and a prediction sample derivation step based on the intra prediction mode/type. In addition, if necessary, a post-filtering step may be performed on the derived prediction sample.

When the intra prediction is applied, the intra prediction mode applied to the current block may be determined by using the intra prediction mode of the neighboring block. For example, the decoding apparatus may select one of the MPM candidates in an MPM (most probable mode) list, which is derived based on the intra prediction mode of the neighboring block (eg, the left and/or upper neighboring block) of the current block and additional candidate modes, based on the received MPM index, or may select one of the remaining intra prediction modes that are not included in the MPM candidates (and the planner mode) based on the remaining intra prediction mode information. The MPM list may be configured to include or not include the planner mode as a candidate. For example, when the MPM list includes the planner mode as a candidate, the MPM list may have 6 candidates, and when the MPM list does not include the planner mode as a candidate, the MPM list may have 5 candidates. When the MPM list does not include the planar mode as a candidate, a not planar flag (eg, intra_luma_not_planar_flag) indicating whether the intra prediction mode of the current block is not the planar mode may be signaled. For example, the MPM flag may be signaled first, and the MPM index and the not planner flag may be signaled when the value of the MPM flag is 1. Also, the MPM index may be signaled when the value of the not planner flag is 1. Here, the reason that the MPM list is configured not to include the planar mode as the candidate is to first check the planar mode by first signaling the flag (not planar flag) since the planar mode is always considered as the MPM rather than that the planar mode is not the MPM.

For example, whether the intra prediction mode applied to the current block is among the MPM candidates (and the planar mode) or the remaining mode may be indicated based on the MPM flag (eg, intra_luma_mpm_flag). The value of the MPM flag of 1 may indicate that the intra prediction mode for the current block is within MPM candidates (and planar mode), and the value of the MPM flag of 0 may indicate that the intra prediction mode for the current block is not within to MPM candidates (and planar mode). The not planar flag (ex. intra_luma_not_planar_flag) value 0 may indicate that the intra prediction mode for the current block is the planar mode, and the not planner flag value 1 may indicate that the intra prediction mode for the current block is not the planar mode. The MPM index may be signaled in the form of mpm_idx or intra_luma_mpm_idx syntax element, and the remaining intra prediction mode information may be signaled in the form of rem_intra_luma_pred_mode or intra_luma_mpm_remainder syntax element. For example, the remaining intra prediction mode information may indicate one of the remaining intra prediction modes not included in the MPM candidates (and planar mode) among all intra prediction modes by indexing in the order of prediction mode number. The intra prediction mode may be the intra prediction mode for a luma component (sample). Hereinafter, the intra prediction mode information may include the MPM flag (ex. intra_luma_mpm_flag), the not planar flag (ex. intra_luma_not_planar_flag), the MPM index (eg. mpm_idx or intra_luma_mpm_idx), and the remanding intra prediction mode information (rem_intra_luma_pred_mode or intra_luma_mpm_remainder). In this document, the MPM list may be referred to by various terms such as an MPM candidate list and candModeList. When the MIP is applied to the current block, a separate the mpm flag (ex. intra_mip_mpm_flag), the mpm index (ex. intra_mip_mpm_idx), and the remaining intra prediction mode information (ex. intra_mip_mpm_remainder) for the MIP may be separately signaled, and the not planar flag is not signaled.

In other words, in general, when an image is divided into blocks, the current block to be coded and a neighboring block have similar image characteristics. Therefore, there is a high probability that the current block and the neighboring block have the same or similar intra prediction modes. Accordingly, the encoding apparatus may use the intra prediction mode of the neighboring block to encode the intra prediction mode of the current block.

For example, the encoding apparatus/decoding apparatus may configure a list of most probable modes (MPM) for the current block. The MPM list may be referred to as an MPM candidate list. Here, the MPM may refer to a mode used to improve coding efficiency in consideration of the similarity between the current block and the neighboring blocks during intra prediction mode coding. As mentioned above, the MPM list may be configured including the planner mode, or may be configured except for the planner mode. For example, when the MPM list includes the planner mode, the number of candidates in the MPM list may be six. And, when the MPM list does not include the planner mode, the number of candidates in the MPM list may be five.

The encoding apparatus/decoding apparatus may configure the MPM list including 5 or 6 MPMs.

In order to configure the MPM list, three types of modes can be considered: Default intra modes, Neighbor intra modes, and Derived intra modes.

For the neighboring intra modes, two neighboring blocks, that is, a left neighboring block and an upper neighboring block may be considered.

As described above, if the MPM list is configured not to include the planar mode, the planar mode is excluded from the list, and the number of MPM list candidates may be set to five.

In addition, among the intra prediction modes, the non-directional mode (or non-angular mode) is a DC mode based on an average of the neighboring reference samples of the current block or a planar mode based on an interpolation-based of the neighboring reference samples.

When the inter prediction is applied, the predictor of the encoding apparatus/decoding apparatus may derive prediction samples by performing inter prediction in units of blocks. Inter prediction can be a prediction derived in a manner that is dependent on data elements (ex. sample values or motion information) of picture(s) other than the current picture. When the inter prediction is applied to the current block, based on the reference block (reference sample arrays) specified by the motion vector on the reference picture pointed to by the reference picture index, the predicted block (prediction sample arrays) for the current block can be derived. In this case, in order to reduce the amount of motion information transmitted in the inter prediction mode, the motion information of the current block may be predicted in units of blocks, subblocks, or samples based on the correlation between the motion information between neighboring blocks and the current block. The motion information may include the motion vector and the reference picture index. The motion information may further include inter prediction type (L0 prediction, L1 prediction, Bi prediction, etc.) information. When the inter prediction is applied, the neighboring blocks may include a spatial neighboring block existing in the current picture and a temporal neighboring block existing in the reference picture. The reference picture including the reference block and the reference picture including the temporal neighboring block may be the same or different. The temporal neighboring block may be called a collocated reference block, a collocated CU (colCU), etc., and a reference picture including the temporally neighboring block may be called a collocated picture (colPic). For example, a motion information candidate list may be constructed based on neighboring blocks of the current block, and a flag or index information indicating which candidate is selected (used) to derive the motion vector and/or the reference picture index of the current block may be signaled. The inter prediction may be performed based on various prediction modes. For example, in the skip mode and the merge mode, the motion information of the current block may be the same as the motion information of a selected neighboring block. In the skip mode, unlike the merge mode, a residual signal may not be transmitted. In the case of a motion vector prediction (MVP) mode, a motion vector of a selected neighboring block may be used as a motion vector predictor, and a motion vector difference may be signaled. In this case, the motion vector of the current block may be derived using the sum of the motion vector predictor and the motion vector difference.

The motion information may include L0 motion information and/or L1 motion information according to an inter prediction type (L0 prediction, L1 prediction, Bi prediction, etc.). A motion vector in the L0 direction may be referred to as an L0 motion vector or MVL0, and a motion vector in the L1 direction may be referred to as an L1 motion vector or MVL1. The prediction based on the L0 motion vector may be called L0 prediction, the prediction based on the L1 motion vector may be called the L1 prediction, and the prediction based on both the L0 motion vector and the L1 motion vector may be called a bi-prediction. Here, the L0 motion vector may indicate a motion vector associated with the reference picture list L0 (L0), and the L1 motion vector may indicate a motion vector associated with the reference picture list L1 (L1). The reference picture list L0 may include pictures that are previous than the current picture in output order as reference pictures, and the reference picture list L1 may include pictures that are subsequent than the current picture in output order. The previous pictures may be called forward (reference) pictures, and the subsequent pictures may be called backward (reference) pictures. The reference picture list L0 may further include pictures that are subsequent than the current picture in output order as reference pictures. In this case, the previous pictures may be indexed first, and the subsequent pictures may be indexed next in the reference picture list L0. The reference picture list L1 may further include pictures previous than the current picture in output order as reference pictures. In this case, the subsequent pictures may be indexed first in the reference picture list 1 and the previous pictures may be indexed next. Here, the output order may correspond to a picture order count (POC) order.

Figure 4:
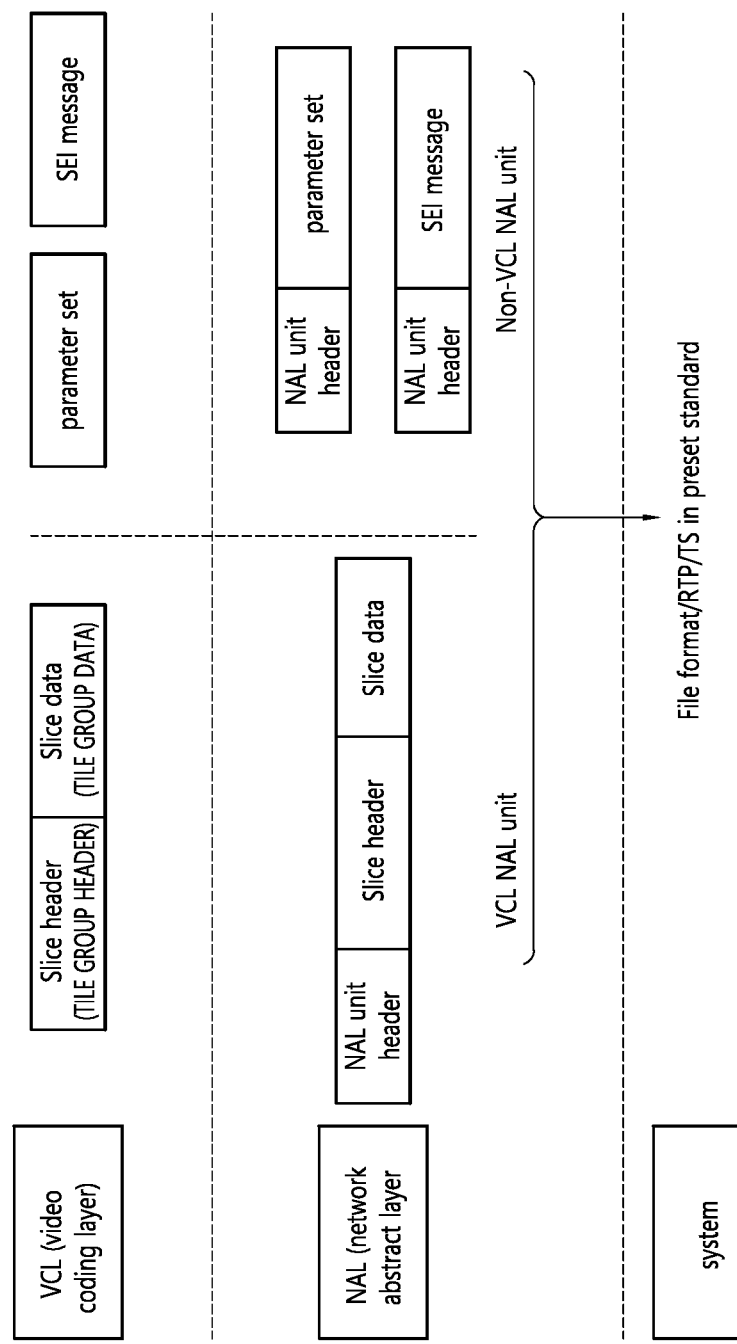
FIG. 4 exemplarily shows a hierarchical structure for a coded image/video.

FIG. 4 exemplarily shows a hierarchical structure for a coded image/video.

Referring to FIG. 4, the coded image/video is divided into VCL (video coding layer) that deals with an image/video decoding process and itself, a subsystem that transmits and stores the coded information, and a network abstraction layer (NAL) that exists between the VCL and subsystems and is responsible for network adaptation functions.

The VCL may generate VCL data including compressed image data (slice data), or generate parameter sets including a picture parameter set (Picture Parameter Set: PPS), a sequence parameter set (Sequence Parameter Set: SPS), a video parameter set (Video Parameter Set: VPS) etc. or a supplemental enhancement information (SEI) message additionally necessary for the decoding process of an image.

In the NAL, a NAL unit may be generated by adding header information (NAL unit header) to a raw byte sequence payload (RBSP) generated in the VCL. In this case, the RBSP refers to slice data, parameter sets, SEI messages, etc. generated in the VCL. The NAL unit header may include NAL unit type information specified according to RBSP data included in the corresponding NAL unit.

As shown in the figure, the NAL unit may be divided into a VCL NAL unit and a Non-VCL NAL unit according to the RBSP generated in the VCL. The VCL NAL unit may mean a NAL unit including information (sliced data) about an image, and the Non-VCL NAL unit may mean a NAL unit containing information (parameter set or SEI message) necessary for decoding an image.

The above-described VCL NAL unit and Non-VCL NAL unit may be transmitted through a network by attaching header information according to a data standard of the subsystem. For example, the NAL unit may be transformed into a data form of a predetermined standard such as H.266/VVC file format, Real-time Transport Protocol (RTP), Transport Stream (TS), etc. and transmitted through various networks.

As described above, in the NAL unit, the NAL unit type may be specified according to the RBSP data structure included in the corresponding NAL unit, and information on this NAL unit type may be stored and signaled in the NAL unit header.

For example, the NAL unit may be roughly classified into the VCL NAL unit type and the Non-VCL NAL unit type depending on whether the NAL unit includes information about the image (slice data). The VCL NAL unit type may be classified according to property and a type of a picture included in the VCL NAL unit, and the Non-VCL NAL unit type may be classified according to the type of a parameter set.

The following is an example of the NAL unit type specified according to the type of parameter set included in the Non-VCL NAL unit type.

APS (Adaptation Parameter Set) NAL unit: Type for NAL unit including APS

DPS (Decoding Parameter Set) NAL unit: Type for NAL unit including DPS

VPS (Video Parameter Set) NAL unit: Type for NAL unit including VPS

SPS (Sequence Parameter Set) NAL unit: Type for NAL unit including SPS

PPS (Picture Parameter Set) NAL unit: Type for NAL unit including PPS

PH (Picture header) NAL unit: Type for NAL unit including PH

The above-described NAL unit types have syntax information for the NAL unit type, and the syntax information may be stored and signaled in the NAL unit header. For example, the syntax information may be nal_unit_type, and NAL unit types may be specified by a nal_unit_type value.

Meanwhile, as described above, one picture may include a plurality of slices, and one slice may include a slice header and slice data. In this case, one picture header may be further added to a plurality of slices (a slice header and a slice data set) in one picture. The picture header (picture header syntax) may include information/parameters commonly applicable to the picture. In this document, a slice may be mixed or replaced with a tile group. Also, in this document, a slice header may be mixed or replaced with a type group header.

The slice header (slice header syntax) may include information/parameters commonly applicable to the slice. The APS (APS syntax) or PPS (PPS syntax) may include information/parameters commonly applicable to one or more slices or pictures. The SPS (SPS syntax) may include information/parameters commonly applicable to one or more sequences. The VPS (VPS syntax) may include information/parameters commonly applicable to multiple layers. The DPS (DPS syntax) may include information/parameters commonly applicable to the entire video. The DPS may include information/parameters related to concatenation of a coded video sequence (CVS). In this document, high level syntax (HLS) may include at least one of the APS syntax, PPS syntax, SPS syntax, VPS syntax, DPS syntax, picture header syntax, and slice header syntax.

In this document, the image/video information encoded in the encoding apparatus and signaled in the form of a bitstream to the decoding apparatus may include, as well as picture partitioning-related information in the picture, intra/inter prediction information, residual information, in-loop filtering information, etc. the information included in the slice header, the information included in the picture header, the information included in the APS, the information included in the PPS, the information included in the SPS, the information included in the VPS, and/or the information included in the DPS. In addition, the image/video information may further include information of the NAL unit header.

Meanwhile, in order to compensate for a difference between an original image and a reconstructed image due to an error occurring in a compression encoding process such as quantization, an in-loop filtering process may be performed on reconstructed samples or reconstructed pictures as described above. As described above, the in-loop filtering may be performed by the filter of the encoding apparatus and the filter of the decoding apparatus, and a deblocking filter, SAO, and/or adaptive loop filter (ALF) may be applied. For example, the ALF process may be performed after the deblocking filtering process and/or the SAO process are completed. However, even in this case, the deblocking filtering process and/or the SAO process may be omitted.

Figure 5:
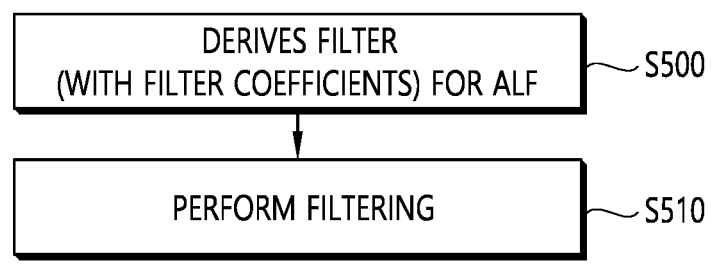
FIG. 5 is a flowchart schematically illustrating an example of an ALF process.

FIG. 5 is a flowchart schematically illustrating an example of an ALF process. The ALF process disclosed in FIG. 5 may be performed in the encoding apparatus and the decoding apparatus. In this document, a coding apparatus may include the encoding apparatus and/or the decoding apparatus.

Referring to FIG. 5, the coding apparatus derives a filter for ALF (S500). The filter may include filter coefficients. The coding apparatus may determine whether to apply the ALF, and when determining to apply the ALF, may derive a filter including filter coefficients for the ALF. A filter (coefficients) for the ALF or information on deriving for the filter (coefficients) for the ALF may be referred to as an ALF parameter. Information on whether the ALF is applied (eg, ALF availability flag) and ALF data for deriving the filter may be signaled from the encoding apparatus to the decoding apparatus. The ALF data may include information for deriving the filter for the ALF. Also, for example, for hierarchical control of the ALF, the ALF availability flag may be signaled at the SPS, picture header, slice header, and/or CTB level, respectively.

In order to derive the filter for the ALF, the activity and/or directivity of the current block (or ALF target block) is derived, and the filter can be derived based on the activity and/or the directionality. For example, the ALF process may be applied in units of 4×4 blocks (based on a luma component). The current block or the ALF target block may be, for example, a CU, or may be a 4×4 block within a CU. Specifically, for example, filters for the ALF may be derived based on first filters derived from information included in the ALF data and predefined second filters, and the coding apparatus may select one of the filters based on the activity and/or the directionality. The coding apparatus may use filter coefficients included in the selected filter for the ALF.

The coding apparatus performs filtering based on the filter (S510). Modified reconstructed samples may be derived based on the filtering. For example, the filter coefficients in the filter may be arranged or assigned according to a filter shape, and the filtering may be performed on reconstructed samples in the current block. Here, the reconstructed samples in the current block may be reconstructed samples after the deblocking filter process and the SAO process are completed. For example, one filter shape may be used, or one filter shape selected from among a plurality of predetermined filter shapes may be used. For example, a filter shape applied to the luma component and a filter shape applied to a chroma component may be different. For example, a 7×7 diamond filter shape may be used for the luma component, and a 5×5 diamond filter shape may be used for the chroma component.

Figure 6:
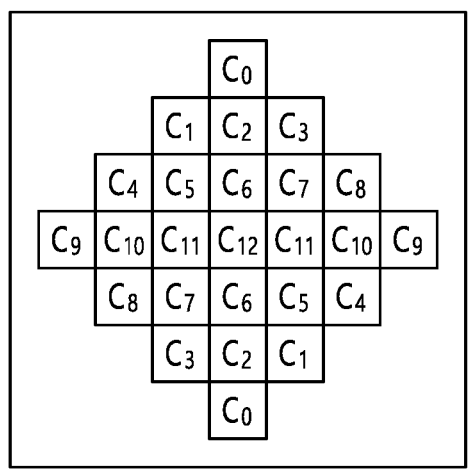
FIG. 6 shows an example of the shape of an ALF filter.
Figure 6:
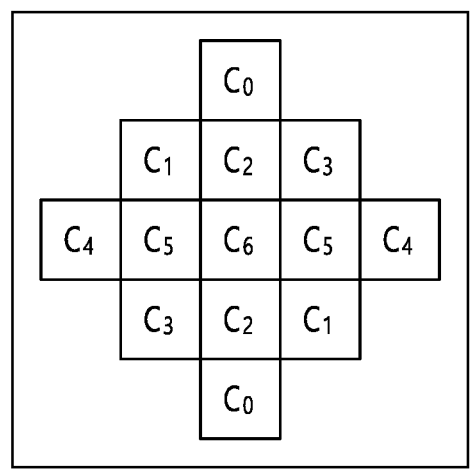

FIG. 6 shows an example of the shape of the ALF filter.

(a) of FIC. 6 shows the shape of a 7×7 diamond filter, (b) of FIG. 6 shows the shape of a 5×5 diamond filter. In FIG. 6, Cn in the filter shape represents a filter coefficient. When n in Cn is the same, this indicates that the same filter coefficients can be assigned. In this document, a position and/or unit to which filter coefficients are assigned according to the filter shape of the ALF may be referred to as a filter tab. In this case, one filter coefficient may be assigned to each filter tap, and the arrangement of the filter taps may correspond to the filter shape. A filter tab located at the center of the filter shape may be referred to as a center filter tab. The same filter coefficients may be assigned to two filter taps of the same n value that exist at positions corresponding to each other with respect to the center filter tap. For example, in the case of the 7×7 diamond filter shape, 25 filter taps are included, and since filter coefficients C0 to C11 are assigned in a centrally symmetric form, filter coefficients can be assigned to the 25 filter taps using only 13 filter coefficients. Also, for example, in the case of the 5×5 diamond filter shape, 13 filter taps are included, and since filter coefficients C0 to C5 are allocated in the centrally symmetrical form, filter coefficients can be allocated to the 13 filter taps using only 7 filter coefficients. For example, in order to reduce the data amount of information about signaled filter coefficients, 12 filter coefficients of the 13 filter coefficients for the 7×7 diamond filter shape are signaled (explicitly), and 1 filter coefficient can be derived (implicitly). Also, for example, 6 coefficients of 7 filter coefficients for the 5×5 diamond filter shape may be signaled (explicitly) and 1 filter coefficient may be derived (implicitly).

According to an embodiment of this document, the ALF parameter used for the ALF process may be signaled through an adaptation parameter set (APS). The ALF parameter may be derived from filter information or ALF data for the ALF.

The ALF is a type of in-loop filtering technique that can be applied in the image/video coding as described above. The ALF may be performed using a Wiener-based adaptive filter. This may be to minimize a mean square error (MSE) between original samples and decoded samples (or reconstructed samples). A high level design for an ALF tool may incorporate syntax elements accessible in the SPS and/or the slice header (or the tile group header).

Figure 7:
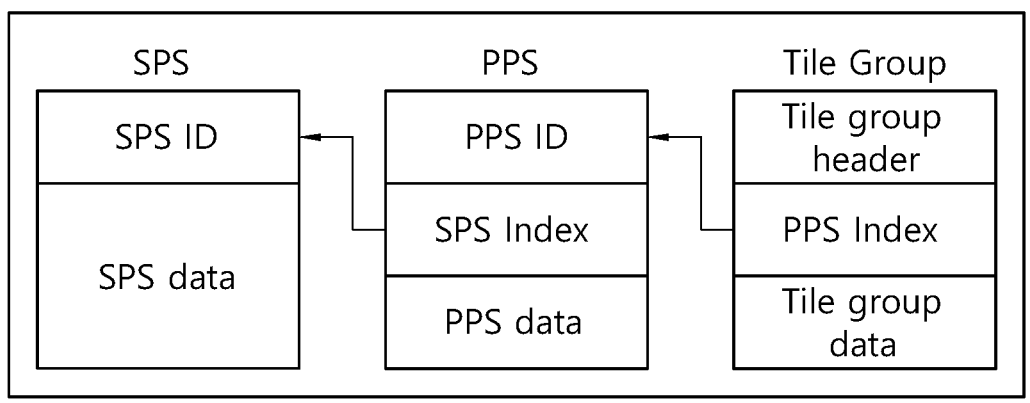
FIG. 7 shows an example of a hierarchical structure of ALF data.

FIG. 7 shows an example of a hierarchical structure of ALF data.

Referring to FIG. 7, a coded video sequence (CVS) may include an SPS, one or more PPSs, and one or more coded pictures that follow. Each coded picture may be divided into rectangular regions. The rectangular regions may be referred to as tiles. One or more tiles may be aggregated to form a tile group or a slice. In this case, the tile group header may be linked to the PPS, and the PPS may be linked to the SPS. According to the existing method, the ALF data (ALF parameter) is included in the tile group header. Considering that one video consists of a plurality of pictures and one picture includes a plurality of tiles, the frequent ALF data (ALF parameter) signaling in units of tile groups reduces coding efficiency.

According to an embodiment proposed in this document, the ALF parameter may be signaled by being included in the APS as follows.

Figure 8:
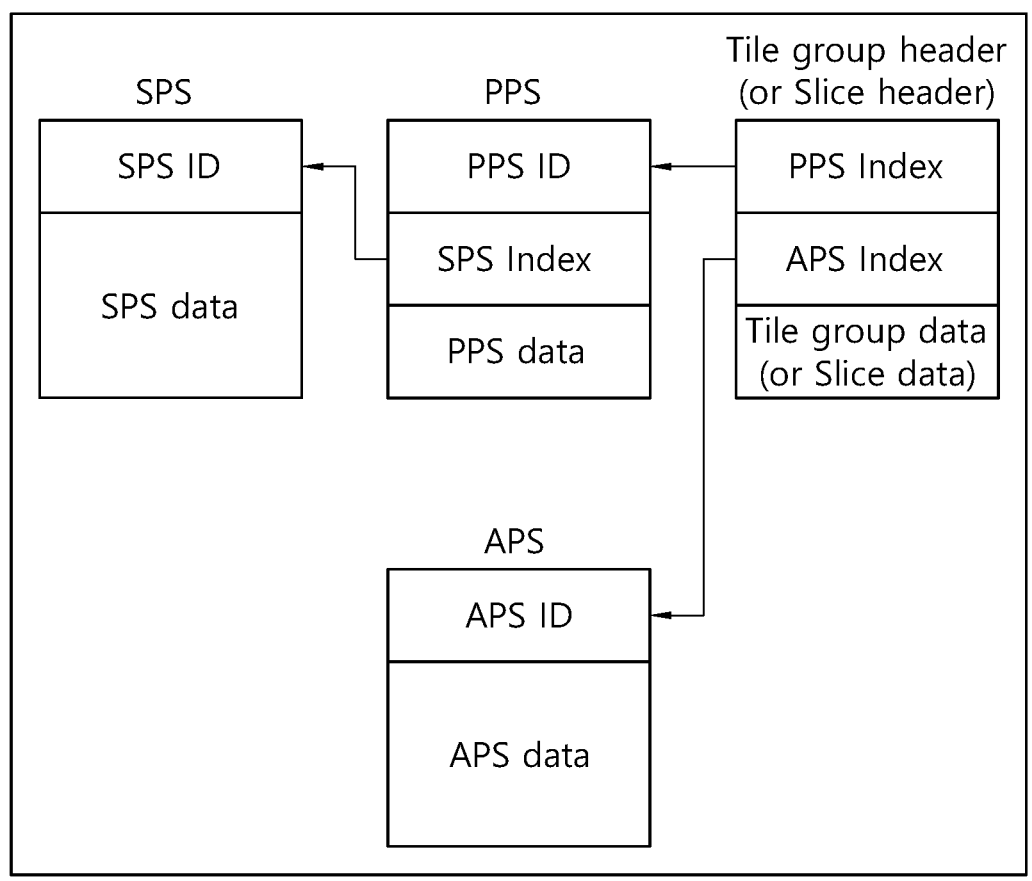
FIG. 8 shows another example of a hierarchical structure of ALF data.

FIG. 8 shows another example of a hierarchical structure of ALF data.

Referring to FIG. 8, an APS is defined, and the APS may carry necessary ALF data (ALF parameters). In addition, the APS may have a self-identification parameter and the ALF data. The self-identification parameter of the APS may include an APS ID. That is, the APS may include information indicating the APS ID in addition to an ALF data field. A tile group header or a slice header may refer to the APS using APS index information. In other words, the tile group header or the slice header may include the APS index information, and the ALF process for the target block can be performed based on the ALF data (the ALF parameter) included in the APS having the APS ID indicated by the APS index information. Here, the APS index information may be referred to as APS ID information.

In addition, the SPS may include a flag allowing the use of the ALF. For example, when the CVS begins, the SPS may be checked, and the flag may be checked in the SPS. For example, the SPS may include the syntax of Table 1 below. The syntax of Table 1 may be a part of the SPS.

TABLE 1

|  | Descriptor |
| --- | --- |
| seq_parameter_set_rbsp( ) {<br>...<br>  sps_alf_enabled_flag<br>} | u(1) |

The semantics of syntax elements included in the syntax of Table 1 may be specified, for example, as shown in the following table.

TABLE 2 sps_alf_enabled_flag equal to 0 specifies that the adaptive loop filter is disabled.
sps_alf_enabled_flag equal to 1 specifies that the adaptive loop filter is enabled.

That is, sps_alf_enabled_flag syntax element may indicate whether ALF is available based on whether the value is 0 or 1. The sps_alf_enabled_flag syntax element may be referred to as an ALF availability flag (which may be referred to as a first ALF availability flag) and may be included in the SPS. That is, the ALF availability flag may be signaled at the SPS (or SPS level). When the value of the ALF availability flag signaled by the SPS is 1, it may be determined that the ALF is basically available for pictures in the CVS referring to the SPS. Meanwhile, as described above, the ALF may be individually turned on/off by signaling an additional availability flag at a lower level than the SPS.

For example, if the ALF tool is available for the CVS, an additional availability flag (which may be called a second ALF availability flag) may be signaled in a tile group header or a slice header. The second ALF availability flag may be parsed/signaled, for example, when the ALF is available at the SPS level. If the value of the second ALF availability flag is 1, the ALF data may be parsed through the tile group header or the slice header. For example, the second ALF availability flag may specify an ALF availability condition for luma and chroma components. The ALF data can be accessed through APS ID information.

TABLE 3

|  | Descriptor |
| --- | --- |
| tile_group_header ( ) { | |
|   tile_group_pic_parameter_set_id | ue(v) |
|   if( sps_alf_enabled_flag ) { | |
|     tile_group_alf_enabled_flag | u(1) |
|     if( tile_group_alf_enabled_flag ) | |
|       tile_group_aps_id | u(5) |
| } | |

TABLE 4

|  | Descriptor |
| --- | --- |
| slice_header ( ) { | |
|   slice_pic_parameter_set_id | ue(v) |
|   if( sps_alf_enabled_flag ) { | |
|     slice_alf_enabled_flag | u(1) |
|     if( tile_group_alf_enabled_flag ) | |
|       slice_aps_id | u(5) |
| } | |

Semantics of syntax elements included in the syntax of Table 3 or Table 4 may be specified, for example, as shown in the following tables.

TABLE 5 tile_group_alf_enabled_flag equal to 1 specifies that adaptive loop filter is enabled and may be applied to Y, Cb, or Cr color component in a tile group. tile_group_alf_enabled_flag equal to 0 specifies that adaptive loop filter is disabled for all color components in a tile group.
tile_group_aps_id specifies the adaptation_parameter_set_id of the APS that the tile group refers to. The TemporalId of the APS NAL unit having adaptation_parameter_set_id equal to tile_group_aps_id shall be less than or equal to the TemporalId of the coded tile group NAL unit.
When multiple APSs with the same value of adaptation_parameter_set_id are referred to by two or more tile groups of the same picture, the multiple APSs with the same value of adaptation_parameter_set_id shall have the same content.

TABLE 6 slice_alf_enabled_flag equal to 1 specifies that adaptive loop filter is enabled and may be applied to Y, Cb, or Cr colour component in a slice. slice_alf_enabled_flag equal to 0 specifies that adaptive loop filter is disabled for all colour components in a slice.
slice_aps_id specifies the adaptation_parameter_set_id of the APS that the slice refers to. The TemporalId of the APS NAL unit having adaptation_parameter_set_id equal to tile_group_aps_id shall be less than or equal to the TemporalId of the coded slice NAL unit.
When multiple APSs with the same value of adaptation_parameter_set_id are referred to by two or more slices of the same picture, the multiple APSs with the same value of adaptation_parameter_set_id shall have the same content.

The second ALF availability flag may include tile_group_alf_enabled_flag syntax element or slice_alf_enabled_flag syntax element.

Based on the APS ID information (ex. tile_group_aps_id syntax element or slice_aps_id syntax element), the APS referenced by the corresponding tile group or the corresponding slice may be identified. The APS may include the ALF data.

Meanwhile, a structure of the APS including the ALF data may be described, for example, based on the following syntax and semantics. The syntax of Table 7 may be a part of the APS.

TABLE 7

|  | Descriptor |
|---|---|
| adaptation_parameter_set_rbsp( ) { |  |
|   adaptation_parameter_set_id | u(5) |
|   alf_data( ) |  |
|   aps_extension_flag | u(1) |
|   if( aps_extension_flag ) |  |
|     while( more_rbsp_data( ) ) |  |
|       aps_extension_data_flag | u(1) |
|   rbsp_trailing_bits( ) |  |
| } |  |

TABLE 8 adaptation_parameter_set_id provides an identifier for the APS for reference by other syntax elements.
  NOTE - APSs can be shared across pictures and can be different in different tile groups within a picture.
aps_extension_flag equal to 0 specifies that no aps_extension_data_flag syntax elements are present in the APS RBSP syntax structure. aps_extension_flag equal to 1 specifies that there are aps_extension_data_flag syntax elements present in the APS RBSP syntax structure.
aps_extension_data_flag may have any value. Its presence and value do not affect decoder conformance to profiles specified in this version of this Specification. Decoders conforming to this version of this Specification shall ignore all aps_extension_data_flag syntax elements.

As described above, adaptation_parameter_set_id syntax element may indicate the identifier of the corresponding APS. That is, the APS may be identified based on the adaptation_parameter_set_id syntax element. The adaptation_parameter_set_id syntax element may be referred to as APS ID information. Also, the APS may include an ALF data field. The ALF data field may be parsed/signaled after the adaptation_parameter_set_id syntax element.

Also, for example, an APS extension flag (ex. aps_extension_flag syntax element) may be parsed/signaled in the APS. The APS extension flag may indicate whether APS extension data flag (aps_extension_data_flag) syntax elements are present. The APS extension flag may be used, for example, to provide extension points for a later version of the VVC standard.

Core processing/handling of the ALF information may be performed in the slice header or the tile group header. The above-described ALF data field may include information on processing of the ALF filter. For example, information that can be extracted from the ALF data field includes information on the number of filters used, information indicating whether the ALF is applied only to the luma component, information about a color component, and an exponential golomb (EG) parameter and/or information on delta values of filter coefficients, and the like.

Meanwhile, the ALF data field may include, for example, ALF data syntaxes as follows.

TABLE 9

|  | Descriptor |
|---|---|
| alf_data( ) { |  |
|   alf_chroma_idc | tu(v) |
|   alf_luma_num_filters_signalled_minus1 | tb(v) |
|   if( alf_luma_num_filters_signalled_minus1 > 0 ) { |  |
|     for( filtIdx = 0; filtIdx < NumAlfFilters; filtIdx++ ) |  |
|       alf_luma_coeff_delta_idx[ filtIdx ] | tb(v) |
|   } |  |
|     alf_luma_coeff_delta_flag | u(1) |
|     if ( !alf_luma_coeff_delta_flag && |  |
|     alf_luma_num_filters_signalled_minus1 > 0 ) |  |
|       alf_luma_coeff_delta_prediction_flag | u(1) |
|     alf_luma_min_eg_order_minus1 | ue(v) |
|     for( i = 0; i < 3; i++ ) |  |
|       alf_luma_eg_order_increase_flag[ i ] | u(1) |
|     if ( alf_luma_coeff_delta_flag ) { |  |
|       for( sigFiltIdx = 0; sigFiltIdx <= |  |
|     alf_luma_num_filters_signalled_minus1; |  |
|     sigFiltIdx++ ) |  |
|       alf_luma_coeff_flag[ sigFiltIdx ] | u(1) |
|   } |  |
|     for( sigFiltIdx = 0; sigFiltIdx <= |  |
|   alf_luma_num_filters_signalled_minus1; |  |
|   sigFiltIdx++ ) { |  |
|     if ( alf_luma_coeff_flag[ sigFiltIdx ] ) { |  |
|       for ( j = 0; j < 12; j++ ) { |  |

TABLE 9-continued

|  | Descriptor |
|---|---|
|         alf_luma_coeff_delta_abs[ sigFiltIdx ][ j ] | uek(v) |
|         if( alf_luma_coeff_delta_abs[ sigFiltIdx ][ j ] ) |  |
|           alf_luma_coeff_delta_sign[ sigFiltIdx ][ j ] | u(1) |
|       } |  |
|     } |  |
|   } |  |
|   if ( alf_chroma_idc > 0 ) { |  |
|     alf_chroma_min_eg_order_minus1 | ue(v) |
|     for( i = 0; i < 2; i++ ) |  |
|       alf_chroma_eg_order_increase_flag[ i ] | u(1) |
|     for( j = 0; j < 6; j++ ) { |  |
|       alf_chroma_coeff_abs[ j ] | uek(v) |
|       if( alf_chroma_coeff_abs[ j ] > 0 ) |  |
|         alf_chroma_coeff_sign[ j ] | u(1) |
|     } |  |
|   } |  |
| } |  |

Semantics of syntax elements included in the syntax of Table 9 may be specified, for example, as shown in the following table.

TABLE 10 alf_chroma_idc equal to 0 specifies that the adaptive loop filter is not applied to Cb and Cr colour components. alf_chroma_idc equal to 1 indicates that the adaptive loop filter is applied to the Cb colour component. alf_chroma_idc equal to 2 indicates that the adaptive loop filter is applied to the Cr colour component. alf_chroma_idc equal to 3 indicates that the adaptive loop filter is applied to Cb and Cr colour components.
The maximum value maxVal of the truncated unary binarization tu(v) is set equal to 3.
The variable NumAlfFilters specifying the number of different adaptive loop filters is set equal to 25.
alf_luma_num_filters_signalled_minus1 plus 1 specifies the number of adpative loop filter c lasses for which luma coefficients can be signalled. The value of alf_luma_num_filters_signalled_minus1 shall be in the range of 0 to NumAlfFilters − 1, inclusive.
The maximum value maxVal of the truncated binary binarization tb(v) is set equal to NumAlfFilters − 1.
alf_luma_coeff_delta_idx[ filtIdx ] specifies the indices of the signalled adaptive loop filter luma coefficient deltas for the filter class indicated by filtIdx ranging from 0 to NumAlfFilters − 1. When alf_luma_coeff_delta_idx[ filtIdx ] is not present, it is inferred to be equal to 0.
The maximum value maxVal of the truncated binary binarization tb(v) is set equal to alf_luma_num_filters_signalled_minus1.
alf_luma_coeff_delta_flag equal to 1 indicates that alf_luma_coeff_delta_prediction_flag is not signalled. alf_luma_coeff_delta_flag equal to 0 indicates that alf_luma_coeff_delta_prediction_flag may be signalled.
alf_luma_coeff_delta_prediction_flag equal to 1 specifies that the signalled luma filter coefficient deltas are predicted from the deltas of the previous luma coefficients.
alf_luma_coeff_delta_prediction_flag equal to 0 specifies that the signalled luma filter coefficient deltas are not predicted from the deltas of the previous luma coefficients. When not present, alf_luma_coeff_delta_prediction_flag is inferred to be equal to 0.
alf_luma_min_eg_order_minus1 plus 1 specifies the minimum order of the exp-Golomb code for luma filter coefficient signalling. The value of alf_luma_min_eg_order_minus1 shall be in the range of 0 to 6, inclusive.
alf_luma_eg_order_increase_flag[ i ] equal to 1 specifies that the minimum order of the exp-Golomb code for luma filter coefficient signalling is incremented by 1.
alf_luma_eg_order_increase_flag[ i ] equal to 0 specifies that the minimum order of the exp-Golomb code for luma filter coefficient signalling is not incremented by 1.
The order expGoOrderY[ i ] of the exp-Golomb code used to decode the values of alf_luma_coeff_delta_abs[ sigFiltIdx ][ j ] is derived as follows:
expGoOrderY[ i ] = alf_luma_min_eg_order_minus1 + 1+ alf_luma_eg_order_increase_flag[ i ]   (7-51)
alf_luma_coeff_flag[ sigFiltIdx ] equal 1 specifies that the coefficients of the luma filter indicated by sigFiltIdx are signalled. alf_luma_coeff_flag[ sigFiltIdx ] equal to 0 specifies that all filter coefficients of the luma filter indicated by sigFiltIdx are set equal to 0. When not present, alf_luma_coeff_flag[ sigFiltIdx ] is set equal to 1.
alf_luma_coeff_delta_abs[ sigFiltIdx ][ j ] specifies the absolute value of the j-th coefficient delta of the signalled luma filter indicated by sigFiltIdx. When alf_luma_coeff_delta_abs[ sigFiltIdx ][ j ] is not present, it is inferred to be equal 0.
The order k of the exp-Golomb binarization uek(v) is derived as follows:
golombOrderIdxY[ ] = { 0, 0, 1, 0, 0, 1, 2, 1, 0, 0, 1, 2 }   (7-52)
k = expGoOrderY[ golombOrderIdxY[ j ] ]   (7-53)
alf_luma_coeff_delta_sign[ sigFiltIdx ][ j ] specifies the sign of the j-th luma coefficient of the filter indicated by sigFiltIdx as follows:
- If alf_luma_coeff_delta_sign[ sigFiltIdx ][ j ] is equal to 0, the corresponding luma filter coefficient has a positive value.
- Otherwise (alf_luma_coeff_delta_sign[ sigFiltIdx ][ j ] is equal to 1), the corresponding luma filter coefficient has a negative value.
When alf_luma_coeff_delta_sign[ sigFiltIdx ][ j ] is not present, it is inferred to be equal to 0.
The variable filterCoefficients[ sigFiltIdx ][ j ] with sigFiltIdx = 0..alf_luma_num_filters_signalled_minus1, j = 0..11 is initialized as follows:
   filterCoefficients[ sigFiltIdx ][ j ] = alf_luma_coeff_delta_abs[ sigFiltIdx ][ j ] *   (7-54)
      ( 1 − 2 * alf_luma_coeff_delta_sign[ sigFiltIdx ][ j ] )
When alf_luma_coeff_delta_prediction_flag is equal 1, filterCoefficients[ sigFiltIdx ][ j ] with sigFiltIdx = 1..alf_luma_num_filters_signalled_minus1 and j = 0..11 are modified as follows:
filterCoefficients[ sigFiltIdx ][ j ] += filterCoefficients[ sigFiltIdx − 1 ][ j ]   (7-55)
The luma filter coefficients AlfCoeff$_L$ with elements AlfCoeff$_L$[ filtIdx ][ j ], with filtIdx = 0..NumAlfFilters − 1 and j = 0..11 are derived as follows
AlfCoeff$_L$[ filtIdx ][ j ] = filterCoefficients[ alf_luma_coeff_delta_idx[ filtIdx ] ][ j ]   (7-56)
The last filter coefficients AlfCoeff$_L$[ filtIdx ][ 12 ] for filtIdx = 0..NumAlfFilters − 1 are derived as follows:
AlfCoeff$_L$[ filtIdx ][ 12 ] = 128 − $\Sigma_k$ ( AlfCoeff$_L$[ filtIdx ][ k ] << 1 ), with k = 0..11
It is a requirement of bitstream conformance that the values of AlfCoeff$_L$[ filtIdx ][ j ] with filtIdx = 0..NumAlfFilters − 1, j = 0..11 shall be in the range of $-2^7$ to $2^7 - 1$, inclusive and that the values of AlfCoeff$_L$[ filtIdx ][ 12 ] shall be in the range of 0 to $2^8 - 1$, inclusive.
alf_chroma_min_eg_order_minus1 plus 1 specifies the minimum order of the exp-Golomb code for chroma filter coefficient signalling. The value of alf_chroma_min_eg_order_minus1 shall be in the range of 0 to 6, inclusive.
alf_chroma_eg_order_increase_flag[ i ] equal to 1 specifies that the minimum order of the exp-Golomb code for chroma filter coefficient signalling is incremented by 1.

TABLE 10-continued alf_chroma_eg_order_increase_flag[ i ] equal to 0 specifies that the minimum order of the exp-
Golomb code for chroma filter coefficient signalling is not incremented by 1
The order expGoOrderC[ i ] of the exp-Golomb code used to decode the values of
alf_chroma_coeff_abs[ j ] is derived as follows:
expGoOrderC[ i ] = alf_chroma_min_eg_order_minus1 + 1+ alf_chroma_eg_order_increase_f
lag[ i ]
alf_chroma_coeff_abs[ j ] specifies the absolute value of the j-th chroma filter coefficient.
When alf_chroma_coeff_abs[ j ] is not present, it is inferred to be equal 0. It is a requirement of
bitstream conformance that the values of alf_chroma_coeff_abs[ j ] shall be in the range of 0 to
$2^7 - 1$, inclusive.
The order k of the exp-Golomb binarization uek(v) is derived as follows:
golombOrderIdxC[ ] = { 0, 0, 1, 0, 0, 1 }                                                (7-59)
k = expGoOrderC[ golombOrderIdxC[ j ] ]                                                  (7-60)
alf_chroma_coeff_sign[ j ] specifies the sign of the j-th chroma filter coefficient as follows:
- If alf_chroma_coeff_sign[ j ] is equal to 0, the corresponding chroma filter coefficient has a
  positive value.
- Otherwise (alf_chroma_coeff_sign[ j ] is equal to 1), the corresponding chroma filter
  coefficient has a negative value.
When alf_chroma_coeff_sign[ j ] is not present, it is inferred to be equal to 0.
The chroma filter coefficients $AlfCoeff_C$ with elements $c_C[ j ]$, with j = 0..5 are derived as
follows:
    $AlfCoeff_C[ j ]$ = alf_chroma_coeff_abs[ j ] * ( 1 - 2 * alf_chroma_coeff_sign[ j ] )   (7-61)
The last filter coefficient for j = 6 is derived as follows:
    $AlfCoeff_C[ 6 ]$ = 128 - $\Sigma_k$ ( $AlfCoeff_C[ k ]$ << 1 ), with k = 0..5           (7-62)
It is a requirement of bitstream conformance that the values of $AlfCoeff_C[ j ]$ with j = 0..5 shall
be in the range of $-2^7 - 1$ to $2^7 - 1$, inclusive and that the values of $AlfCoeff_C[ 6 ]$ shall be in the
range of 0 to $2^8 - 1$, inclusive.

For example, parsing of the ALF data through the tile group header or the slice header may be started by first parsing/signaling alf_chroma_idc syntax element. The alf_chroma_idc syntax element may have values ranging from 0 to 3. The values may indicate whether the ALF-based filtering process is applied only to the luma component, or to a combination of luma and chroma components. Once the availability (available parameters) for each component is determined, information about the number of luma (component) filters may be parsed. As an example, the maximum number of the filters that can be used may be set to 25. If the number of signaled luma filters is at least one, for each filter ranging from 0 to the maximum number of filters (ex. 25, which may alternatively be known as class), index information for the filter may be parsed/signaled. This may imply that every class (ie, from 0 to the maximum number of filters) is associated with a filter index. When a filter to be used for each class is labeled based on the filter index, a flag (eg, alf_luma_coeff_delta_flag) may be parsed/signaled. The flag may be used to interpret whether flag information (ex. alf_luma_coeff_delta_prediction_flag) related to prediction of an ALF luma filter coefficient delta value exists in the slice header or the tile group header.

If the number of luma filters signaled by alf_luma_num_filters_signalled_minus1 syntax element is greater than 0 and the value of the alf_luma_coeff_delta_flag syntax element is 0, it can mean that the alf_luma_coeff_delta_prediction_flag syntax element is present in the slice header or the tile group header and its status may be evaluated. If the state of the alf_luma_coeff_delta_prediction_flag syntax element indicates 1, this may mean that luma filter coefficients are predicted from previous luma (filter) coefficients. If the state of the alf_luma_coeff_delta_prediction_flag syntax element indicates 0, this may mean that luma filter coefficients are not predicted from deltas of the previous luma (filter) coefficients.

When delta filter coefficients (ex. alf_luma_coeff_delta_abs) are coded based on the exponential Gollum code, order k (order-k) of the exponential Gollum (EG) code may have to be determined in order to decode the delta luma filter coefficients (eg alf_luma_coeff_delta_abs). This information may be needed to decode the filter coefficients. The order of the exponential Gollum code may be expressed as EG(k). In order to determine the EG(k), alf_luma_min_eg_order_minus1 syntax element may be parsed/signaled. The alf_luma_min_eg_order_minus1 syntax element may be an entropy-coded syntax element. The alf_luma_min_eg_order_minus1 syntax element may indicate the smallest order of the EG used for decoding the delta luma filter coefficients. For example, the value of the alf_luma_min_eg_order_minus1 syntax element may be in a range of 0 to 6. After the alf_luma_min_eg_order_minus1 syntax element is parsed/signaled, the alf_luma_eg_order_increase_flag syntax element may be parsed/signaled. If the value of the alf_luma_eg_order_increase_flag syntax element is 1, this indicates that the order of the EG indicated by the alf_luma_min_eg_order_minus1 syntax element increases by 1. If the value of the alf_luma_eg_order_increase_flag syntax element is 0, this indicates that the order of the EG indicated by the alf_luma_min_eg_order_minus1 syntax element does not increase. The order of the EG may be represented by an index of the EG. The EG order (or EG index) based on the alf_luma_min_eg_order_minus1 syntax element and the alf_luma_eg_order_increase_flag syntax element (related to the luma component) may be determined, for example, as follows.

TABLE 11

1. The maximum golomb index is pre-defined according to the filter type. That is for a 5x5 filter the maximum golomb index is 2, and for a 7x7 the maximum golomb index is 3.
2. An initial constant, Kmin is set to be alf_luma_min_eg_order_minus1 + 1
3. For each index, i in the range of {0 to maximum golomb index}, an intermediate array. i.e., KminTab[i] is computed, consisting of the sum of
    KminTab[i] = Kmin + alf_luma_eg_order_increase_flag[i]

TABLE 11-continued

4. Kmin is refreshed at the end of each iteration to be
   Kmin = KminTab[i]

Based on the above determination process, expGoOrderY can be derived as xpGoOrderY=KminTab. Through this, an array including EG orders can be derived, which can be used by the decoding device. The expGoOrderY may indicate the EG order (or the EG index).

There may be a pre-defined Gollum order index (ie, golombOrderIdxY). The predefined Gollomb order may be used to determine a final golomb order for coding the coefficients.

For example, the predefined Gollum order may be configured as, for example, in the following table.

golombOrderIdxY[ ]={0,0,1,0,1,2,1,0,0,1,2}

Here, order k=expGoOrderY[golombOrderIdxY[j]], and j may be indicated the jth signaled filter coefficients. For example, if j=2, that is, the third filter coefficient, golomborderIdxY[2]=1, and thus k=expGoOrderY[1].

In this case, for example, if the value of the alf_luma_coeff_delta_flag syntax element represents true, that is, 1, for every filter that is signaled, the alf_luma_coeff_flag syntax element may be signaled. The alf_luma_coeff_flag syntax element indicates whether a luma filter coefficient is (explicitly) signaled.

When the EG order and the states of the aforementioned related flags (eg, alf_luma_coeff_delta_flag, alf_luma_coeff_flag, etc.) are determined, difference information and sign information of the luma filter coefficients may be parsed/signaled (ie, when alf_luma_coeff_flag indicates true). Delta absolute value information (alf_luma_coeff_delata_abs syntax element) for each of the 12 filter coefficients may be parsed/signaled. In addition, if the alf_luma_coeff_delta_abs syntax element has a value, the sign information (alf_luma_coeff_delta_sign syntax element) may be parsed/signaled. The information including the difference information and the sign information of the luma filter coefficients may be referred to as information about the luma filter coefficients.

The deltas of the filter coefficients may be determined and stored along with the sign. In this case, the deltas of the signed filter coefficients may be stored in the form of an array, which may be expressed as filterCoefficients. The deltas of the filter coefficients may be referred to as delta luma coefficients, and the deltas of the signed filter coefficients may be referred to as signed delta luma coefficients.

To determine the final filter coefficients from the signed delta luma coefficients, the (luma) filter coefficients may be updated as follows.

filterCoefficients[sigFiltIdx][j]+=filterCoefficients[sigFiltIdx][j]

Here, j may indicate a filter coefficient index, and sigFiltIdx may indicate a signaled filter index. j={0, . . . , 11} and sigFiltIdx={0, . . . , alf_luma_filters_signaled_minus1}.

The coefficients may be copied into the final AlfCoeffL [filtIdx][j]. Here, filtidx=0, . . . , 24 and j=0, . . . , 11

The signed delta luma coefficients for a given filter index may be used to determine the first 12 filter coefficients. The thirteenth filter coefficient of the 7×7 filter may be determined based on the following equation, for example. The thirteenth filter coefficient may represent the above-described center tap filter coefficient.

$$AlfCoeff_L[filtIdx][12]=128-\Sigma_k AlfCoeff_L[filtIdx][k]$$
$$<<1 \quad \text{[Equation 1]}$$

Here, the filter coefficient index 12 may indicate the thirteenth filter coefficient. For reference, since the filter coefficient index starts from 0, the value of 12 may indicate the thirteenth filter coefficient.

For example, in order to ensure bitstream conformance, the value of the final filter coefficients AlfCoeffL[filtIdx] [k] ranges from $-2^7$ to $2^7-1$ when k is 0, . . . , 11, and when k is 12, it can be from 0 to $2^8-1$. Here, k may be replaced with j.

If the processing for the luma component is performed, the processing for the chroma component may be performed based on the alf_chroma_idc syntax element. If the value of the alf_chroma_idc syntax element is greater than 0, the minimum EG order information for the chroma component (eg, alf_chroma_min_eg_order_minus1 syntax element) may be parsed/signaled. According to the above-described embodiment of the present document, the 5×5 diamond filter shape may be used for the chroma component, and in this case, the maximum Gollum index may be 2. In this case, the EG order (or the EG index) for the chroma component may be determined, for example, as follows.

TABLE 12

1. An initial constant, Kmin is set to be alf_chroma_min_eg_order_minus1 + 1
2. For each index, i in the range of {0 to maximum golomb index}, an intermediate array, i.e., KminTab[i] is computed, consisting of the sum of
   KminTab[i] = Kmin + alf_chroma_eg_order_increase_flag[i]
3. Kmin is refreshed at the end of each iteration to be
   Kmin = KminTab[i]

Based on the determination process, expGoOrderC may be derived as expGoOrderC=KminTab. Through this, an array including the EG orders can be derived, which can be used by the decoding apparatus. The expGoOrderC may indicate the EG order (or the EG index) for the chroma component.

There may be a predefined (pre-defined) Gollum order index (golombOrderIdxC). The predefined Gollomb order may be used to determine a final golomb order for coding the coefficients.

For example, the predefined Gollum order may be configured as, for example, in the following table.

golombOrderIdxC[ ]={0,0,1,0,0,1}

Here, the order k=expGoOrderC[golombOrderIdxC[j]], and j may represent the j-th signaled filter coefficient. For example, if j=2, that is, the third filter coefficient, golomborderIdxY[2]=1, and thus k=expGoOrderC[1].

Based on this, absolute value information and the sign information of the chroma filter coefficients may be parsed/signaled. Information including the absolute value information and the sign information of the chroma filter coefficients may be referred to as information about the chroma filter coefficients. For example, the 5×5 diamond filter shape may be applied to the chroma component, and in this case, the absolute delta information (alf_chroma_coeff_abs syntax element) for each of the six (chroma component) filter coefficients may be parsed/signaled. In addition, if the value of the alf_chroma_coeff_abs syntax element is greater than 0, the sign information (alf_chroma_coeff_sign syntax element) may be parsed/signaled. For example, the six chroma filter coefficients may be derived based on information about the chroma filter coefficients. In this case, the seventh chroma filter coefficient may be determined based on the following equation, for example. The seventh filter coefficient may represent the above-described center tap filter coefficient.

$$\text{AlfCoeff}_C[6]=128-\Sigma_k \text{AlfCoeff}_C[\text{filtIdx}][k]\ll 1 \quad [\text{Equation 13}]$$

Here, the filter coefficient index 6 may indicate the seventh filter coefficient. For reference, since the filter coefficient index starts from 0, a value of 6 may indicate the seventh filter coefficient.

For example, to ensure bitstream conformance conformance), the value of the final filter coefficients AlfCoeffC [filtIdx][k] ranges from $-2^7$ to $2^7-1$ when k is 0, ..., 5, and when k is 6, it may be from 0 to $2^8-1$. Here, k may be replaced with j.

If (luma/chroma) filter coefficients are derived, an ALF-based filtering may be performed based on the filter coefficients or the filter including the filter coefficients. As described above, modified reconstructed samples can be derived through this. In addition, multiple filters may be derived, and the filter coefficients of one of the multiple filters may be used for the ALF process. As an example, one of the plurality of filters may be indicated based on the signaled filter selection information. Or, for example, one of the plurality of filters may be selected based on the activity and/or directionality of the current block or the ALF target block, and the filter coefficients of the selected filter may be used for the ALF process.

Meanwhile, as described above, the luma mapping with chroma scaling (LMCS) may be applied to increase coding efficiency. The LMCS may be referred to as a loop reshaper (reshaping). In order to increase coding efficiency, signaling of LMCS control and/or LMCS-related information may be performed hierarchically.

Figure 9:
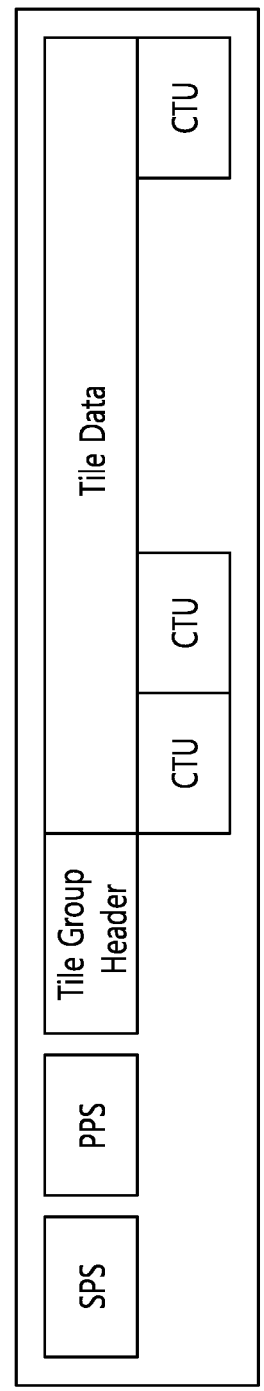
FIG. 9 exemplarily illustrates a hierarchical structure of a CVS according to an embodiment of the present document.

FIG. 9 exemplarily illustrates a hierarchical structure of a CVS according to an embodiment of the present document. A coded video sequence (CVS) may include a sequence parameter set (SPS), a picture parameter set (PPS), a tile group header, tile data, and/or CTU(s). Here, the tile group header and the tile data may be referred to as a slice header and slice data, respectively.

The SPS may include flags natively to enable tools to be used in the CVS. In addition, the SPS may be referred to by the PPS including information on parameters that change for each picture. Each of the coded pictures may include tiles of one or more coded rectangular domain. The tiles may be grouped in a raster scan forming tile groups. Each tile group is encapsulated with header information called a tile group header. Each tile consists of a CTU containing coded data. Here the data may include original sample values, predicted sample values, and its luma and chroma components (luma prediction sample values and chroma prediction sample values).

Figure 10:
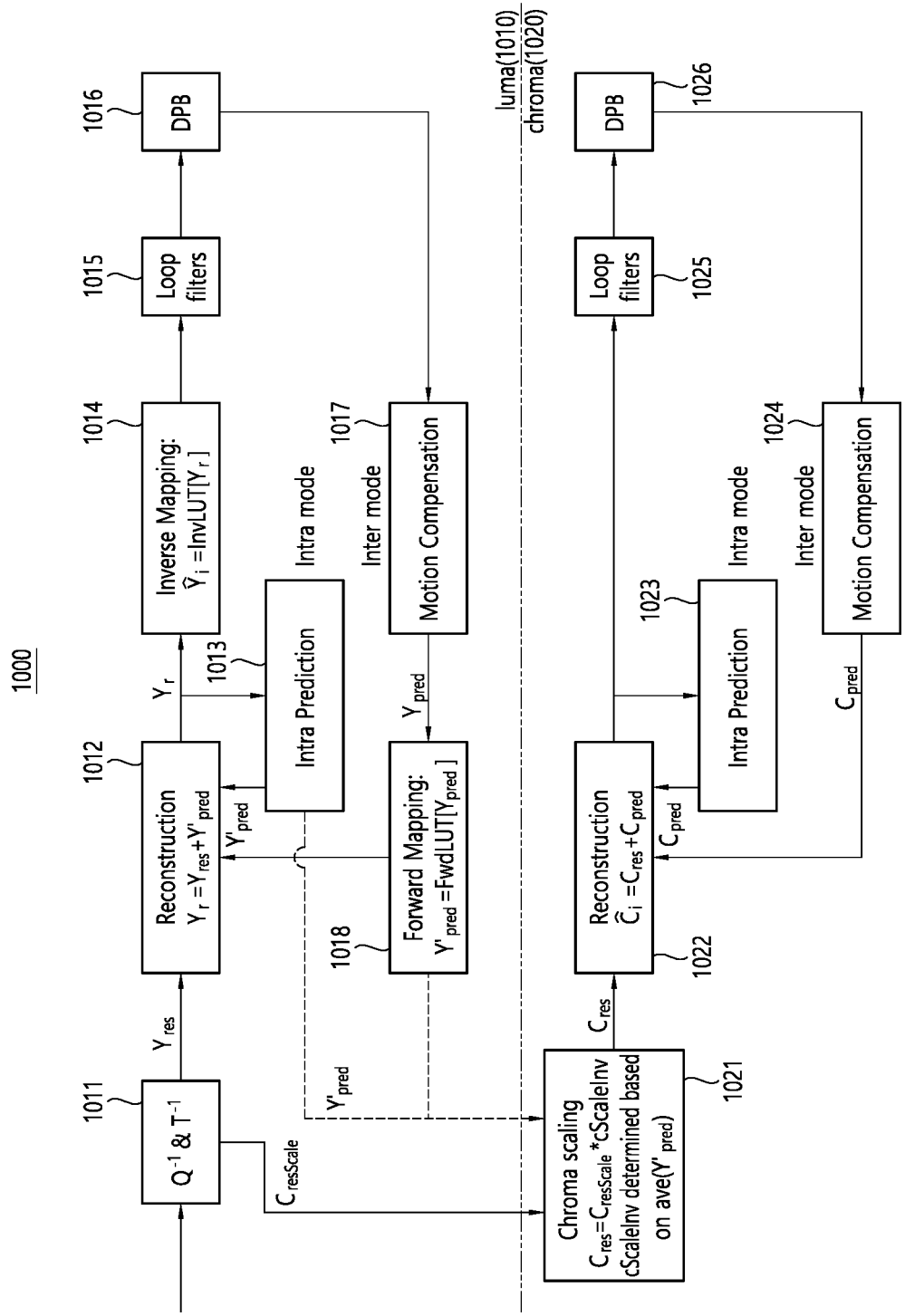
FIG. 10 shows an exemplary LMCS structure according to an embodiment of this document.

FIG. 10 illustrates an exemplary LMCS structure according to an embodiment of this document. The LMCS structure 1000 of FIG. 10 may include an in-loop mapping part 1010 for the luma components based on adaptive piecewise linear (adaptive PWL) models and a luma-dependent chroma residual scaling part 1020 for the chroma components. Blocks of dequantization and inverse transform 1011, reconstruction 1012, and intra prediction 1013 of the in-loop mapping portion 1010 represent processes applied in the mapped (reshaped) domain. Blocks of loop filters 1015, motion compensation or inter prediction 1017 of in-loop mapping part 1010, and blocks of reconstruction 1022, intra prediction 1023, motion compensation or inter prediction 1024, loop filters 1025 of chroma residual scaling part 1020 represent processes applied in the original (non-mapped, non-reshaped) domain.

As illustrated in FIG. 10, when the LMCS is enabled, at least one of an inverse reshaping (mapping) process 1014, a forward reshaping (mapping) process 1018, and a chroma scaling process 1021 may be applied. For example, the inverse reshaping process may be applied to a (reconstructed) luma sample (or luma samples or luma sample array) of the reconstructed picture. The inverse reshaping process may be performed based on a piecewise function (inverse) index of the luma sample. The piecewise function (inverse) index can identify the fragment (or part) to which the luma sample belongs. The output of the inverse reshaping process is a modified (reconstructed) luma sample (or modified luma samples or modified luma sample array). The LMCS may be enabled or disabled at a tile group (or a slice), a picture, or higher level.

A forward reshaping process and/or a chroma scaling process may be applied to generate a reconstructed picture. A picture may include luma samples and chroma samples. A reconstructed picture with luma samples may be referred to as a reconstructed luma picture, and a reconstructed picture with chroma samples may be referred to as a reconstructed chroma picture. A combination of the reconstructed luma picture and the reconstructed chroma picture may be referred to as a reconstructed picture. The reconstructed luma picture may be generated based on the forward reshaping process. For example, if the inter prediction is applied to the current block, the forward reshaping is applied to the luma prediction sample derived based on the (reconstructed) luma sample of the reference picture. Since the (reconstructed) luma sample of the reference picture is generated based on the inverse reshaping process, the forward reshaping may be applied to the luma prediction sample to derive a reshaped (mapped) luma prediction sample. The forward reshaping process may be performed based on the piecewise function index of the luma prediction sample. The piecewise function index may be derived based on a value of a luma prediction sample or a value of a luma sample of the reference picture used for the inter prediction. The reconstructed sample may be generated based on the (reshaped/mapped) luma prediction sample. The inverse reshaping (mapping) process may be applied to the reconstructed sample. The reconstructed sample to which the inverse reshaping (mapping) process has been applied may be referred to as an inverse reshaped (mapped) reconstructed sample. Also, the inverse reshaped (mapped) reconstructed sample may be simply referred to as a reshaped (mapped) reconstructed sample. When the intra prediction (or intra block copy (IBC)) is applied to the current block, the forward mapping for the prediction sample(s) of the current block may not be needed because the inverse reshaping process has not yet been applied to the reconstructed samples of the referenced current picture. In the reconstructed luma picture, the (reconstructed) luma sample may be generated based on the (reshaped) luma prediction sample and the corresponding luma residual sample.

The reconstructed chroma picture may be generated based on a chroma scaling process. For example, the (reconstructed) chroma sample in the reconstructed chroma picture may be derived based on the chroma prediction sample and the chroma residual sample ($c_{res}$) in the current block. The chroma residual sample ($c_{res}$) is derived based on a (scaled) chroma residual sample ($c_{resScale}$) and a chroma residual scaling factor (cScaleInv may be referred to as varScale) for the current block. The chroma residual scaling factor may be calculated based on the reshaped luma prediction sample values in the current block. For example, the scaling factor may be calculated based on an average luma value (ave ($Y'_{pred}$)) of the reshaped luma prediction sample values ($Y'_{pred}$). For reference, the (scaled) chroma residual sample derived based on inverse transform/dequantization in FIG. 10 may be referred to as $c_{resScale}$ and the chroma residual sample derived by performing a (inverse) scaling process on the (scaled) chroma residual sample may be referred to as $c_{res}$.

Figure 11:
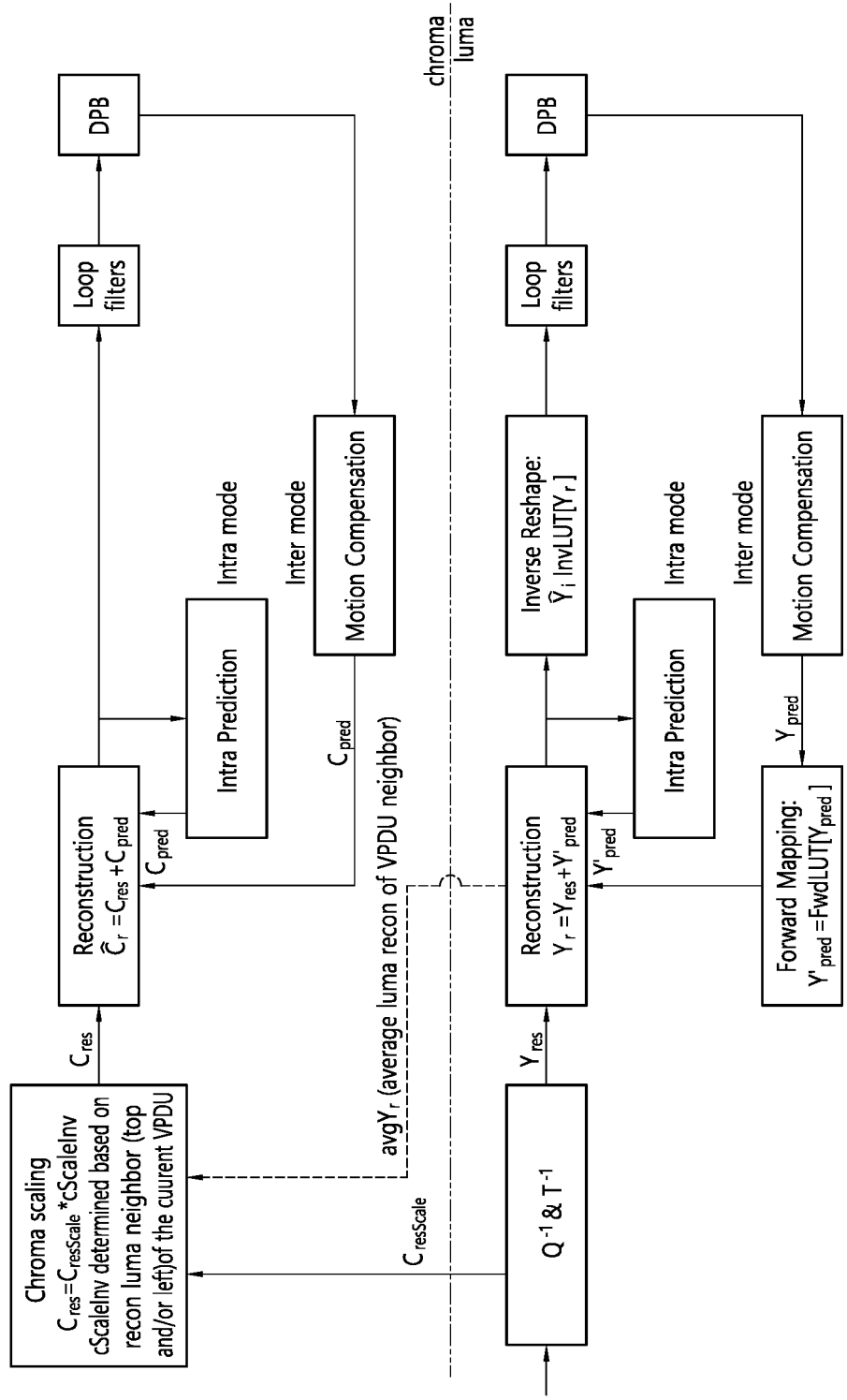
FIG. 11 shows an exemplary LMCS structure according to another embodiment of this document.

FIG. 11 shows an LMCS structure according to another embodiment of the present document. FIG. 11 will be described with reference to FIG. 10. Here, the difference between the LMCS structure of FIG. 11 and the LMCS structure of FIG. 10 will be mainly described. An in-loop mapping part and a luma-dependent chroma residual scaling part of FIG. 11 may operate in the same way as the in-loop mapping part and the luma-dependent chroma residual scaling part of FIG. 10.

Referring to FIG. 11, a chroma residual scaling factor may be derived based on luma reconstruction samples. In this case, an average luma value (avgY$_r$) may be obtained based on the neighboring luma reconstruction samples outside the reconstruction block, not the luma reconstruction samples within the reconstruction block, and the chroma residual scaling factor may be derived based on the average luma value (avgY$_r$). Here, the neighboring luma reconstruction samples may be the neighboring luma reconstruction samples of the current block, or may be neighboring luma reconstruction samples of virtual pipeline data units (VPDUs) including the current block. For example, when the intra prediction is applied to the target block, reconstructed samples may be derived based on prediction samples derived based on the intra prediction. Also, for example, when the inter prediction is applied to the target block, forward mapping is applied to prediction samples derived based on the inter prediction, and reconstructed sampleds may be generated based on reshaped (or forward mapped) luma prediction samples.

The moving picture/image information signaled through the bitstream may include LMCS parameters (information about LMCS). The LMCS parameters may be configured as high level syntax (HLS, including slice header syntax) or the like. A detailed description of the LMCS parameters and configuration will be described later. As described above, the syntax tables described in this document (and the following embodiments) may be constructed/encoded at the encoder (the encoding apparatus) side and signaled to the decoder (the decoding apparatus) side through the bitstream. The decoder may parse/decode information about the LMCS (in the form of syntax components) in the syntax tables. One or more embodiments to be described below may be combined. The encoder may encode the current picture based on the information about the LMCS and the decoder may decode the current picture based on the information about the LMCS.

The in-loop mapping of the luma components can adjust a dynamic range of the input signal by redistributing the codewords across the dynamic range to improve compression efficiency. For the luma mapping, a forward mapping (reshaping) function (FwdMap) and an inverse mapping (reshaping) function (InvMap) corresponding to the forward mapping function (FwdMap) may be used. The forward mapping function (FwdMap) may be signaled using partial linear models, for example, the partial linear models may have 16 pieces or bins. The pieces may have the same length. In one example, the inverse mapping function (InvMap) may not be signaled separately, and instead may be derived from the forward mapping function (FwdMap). That is, the inverse mapping may be a function of the forward mapping. For example, the inverse mapping function may be a function in which the forward mapping function is symmetric based on y=x.

In-loop (luma) reshaping can be used to map input luma values (samples) to changed values in the reshaped domain. The reshaped values can be encoded and mapped back to the original (unmapped, unreshaped) domain after reconstruction. A chroma residual scaling may be applied to compensate for a difference between the luma signal and the chroma signal. The in-loop reshaping may be performed by specifying high-level syntax for the reshaper model. The reshaper model syntax may signal a partial linear model (PWL model). A forward lookup table (FwdLUT) and/or an inverse lookup table (InvLUT) may be derived based on the partial linear model. As an example, when the forward lookup table FwdLUT is derived, the inverse lookup table InvLUT may be derived based on the forward lookup table FwdLUT. The forward lookup table FwdLUT may map the input luma values Yi to the changed values Yr, and the inverse lookup table InvLUT may map the reconstructed values Yr based on the changed values to the reconstructed values Y'i. The reconstructed values Y'i may be derived based on the input luma values Yi.

In one example, the SPS may include the syntax of Table 13 below. The syntax of Table may include sps_reshaper_enabled_flag as a tool enabling flag. Here, sps_reshaper_enabled_flag may be used to specify whether the reshaper is used in the coded video sequence (CVS). That is, sps_reshaper_enabled_flag may be a flag for enabling reshaping in the SPS. In one example, the syntax of Table 13 may be a part of the SPS.

TABLE 13

| | Descriptor |
|---|---|
| seq_parameter_set_rbsp( ) { | |
|   sps_seq_parameter_set_id | ue(v) |
|   ... | |
|   sps_reshaper_enabled_flag | u(1) |
|   rbsp_trailing_bits( ) | |
| } | |

In an example, semantics that may be indicated by sps_seq_parameter_set_id and sps_reshaper_enabled_flag may be as shown in Table 14 below.

TABLE 14 sps_seq_parameter_set_id provides an identifier for the SPS for reference by other syntax elements.
sps_reshaper_enabled_flag equal to 1 specifies that reshaper is used in the coded video sequence (CVS). sps_reshaper_enabled_flag equal to 0 specifies that reshaper is not used in the CVS.

In one example, the tile group header or the slice header may include the syntax of Table 15 or Table 16 below.

TABLE 15

|  | Descriptor |
|---|---|
| tile_group_header( ) { |  |
|   tile_group_pic_parameter_set_id | ue(v) |
| ... |  |
|   if( num_tiles_in_tile_group_minus1 > 0 ) { |  |
|     offset_len_minus1 | ue(v) |
|     for( i = 0; i < num_tiles_in_tile_group_minus1; i++ ) |  |
|       entry_point_offset_minus1[ i ] | u(v) |
|   } |  |
|   if ( sps_reshaper_enabled_flag ) { |  |
|     tile_group_reshaper_model_present_flag | u(1) |
|     if ( tile_group_reshaper_model_present_flag ) |  |
|       tile_group_reshaper_model ( ) |  |
|     tile_group_reshaper_enable_flag | u(1) |
|     if ( tile_group_reshaper_enable_flag && (!( qtbtt_dual_tree_intra_flag && tile_group_type == I ) ) ) |  |
|       tile_group_reshaper_chroma_residual_scale_flag | u(1) |
|   } |  |
|   byte_alignment( ) |  |
| } |  |

TABLE 16

|  | Descriptor |
|---|---|
| slice_header( ) { |  |
|   slice_pic_parameter_set_id | ue(v) |
| ... |  |
|   if( num_tiles_in_slice_minus1 > 0 ) { |  |
|     offset_len_minus1 | ue(v) |
|     for( i = 0; i < num_tiles_in_slice_minus1; i++ ) |  |
|       entry_point_offset_minus1[ i ] | u(v) |
|   } |  |
|   if ( sps_reshaper_enabled_flag ) { |  |
|     slice_reshaper_model_present_flag | u(1) |
|     if ( slice_reshaper_mode_present_flag ) |  |
|       slice_reshaper_model ( ) |  |
|     slice_reshaper_enable_flag | u(1) |
|     if ( slice_reshaper_enable_flag && (!( qtbtt_dual_tree_intra_flag && slice_type == I ) ) ) |  |
|       slice_reshaper_chroma_residual_scale_flag | u(1) |
|   } |  |
|   byte_alignment( ) |  |
| } |  |

Semantics of syntax elements included in the syntax of Table 15 or Table 16 may include, for example, matters disclosed in the following tables.

TABLE 17 tile_group_reshaper_model_present_flag equal to 1 specifies tile_group_reshaper_model( ) is present in tile group header. tile_group_reshaper_model_present_flag equal to 0 specifies tile_group_reshaper_model( ) is not present in tile_group_header. When tile_group_reshaper_model_present_flag is not present, it is inferred to be equal to 0.

TABLE 17-continued tile_group_reshaper_enabled_flag equal to 1 specifies that reshaper is enabled for the current
tile group. tile_group_reshaper_enabled_flag equal to 0 specifies that reshaper is not enabled
for the current tile group. When tile_group_reshaper_enable_flag is not present, it is inferred to
be equal to 0.
tile_group_reshaper_chroma_residual_scale_flag equal to 1 specifies that chroma residual
scaling is enabled for the current tile group. tile_group_reshaper_chroma_residual_scale_flag
equal to 0 specifies that chroma residual scaling is not enabled for the current tile group. When
tile_group_reshaper_chroma_residual_scale_flag is not present, it is inferred to be equal to 0.

TABLE 18 slice_reshaper_model_present_flag equal to 1 specifies slice_reshaper_model( ) is present in
slice header. slice_reshaper_model_present_flag equal to 0 specifies slice_reshaper_model( ) is
not present in slice header. When slice_reshaper_model_present_flag is not present, it is inferred
to be equal to 0.
slice_reshaper_enabled_flag equal to 1 specifies that reshaper is enabled for the current slice.
slice_reshaper_enabled_flag equal to 0 specifies that reshaper is not enabled for the current slice.
When slice_reshaper_enable_flag is not present, it is inferred to be equal to 0.
slice_reshaper_chroma_residual_scale_flag equal to 1 specifies that chroma residual
scaling is enabled for the current slice. slice_reshaper_chroma_residual_scale_flag equal to 0
specifies that chroma residual scaling is not enabled for the current slice. When
slice_reshaper_chroma_residual_scale_flag is not present, it is inferred to be equal to 0.

As an example, if sps_reshaper_enabled_flag is parsed, additional data (eg, information included in Table 15 or 16 above) used to configure lookup tables (FwdLUT and/or InvLUT) may be parsed in the tile group header. To this end, the state of the SPS reshaper flag may be checked in the slice header or the tile group header. When sps_reshaper_enabled_flag is true (or 1), an additional flag, tile_group_reshaper_model_present_flag (or slice_reshaper_model_present_flag) may be parsed. The purpose of the tile_group_reshaper_model_present_flag (or slice_reshaper_model_present_flag) may be to indicate the existence of the reshaper model. For example, when tile_group_reshaper_model_present_flag (or slice_reshaper_model_present_flag) is true (or 1), it may be indicated that a reshaper exists for the current tile group (or the current slice). When tile_group_reshaper_model_present_flag (or slice_reshaper_model_present_flag) is false (or 0), it may be indicated that the reshaper does not exist for the current tile group (or the current slice).

If the reshaper exists and the reshaper is enabled in the current tile group (or the current slice), the reshaper model (eg, tile_group_reshaper_model( ) or slice_reshaper_model( )) may be processed, in addition to an additional flag, tile_group_reshaper_enable_flag (or slice_reshaper_enable_flag) may also be parsed. The tile_group_reshaper_enable_flag (or slice_reshaper_enable_flag) may indicate whether the reshaper model is used for the current tile group (or the current slice). For example, if tile_group_reshaper_enable_flag (or slice_reshaper_enable_flag) is 0 (or false), it may be indicated that the reshaper model is not used for the current tile group (or the current slice). If tile_group_reshaper_enable_flag (or slice_reshaper_enable_flag) is 1 (or true), it may be indicated that the reshaper model is used for the current tile group (or the current slice).

As an example, for example, tile_group_reshaper_model_present_flag (or slice_reshaper_model_present_flag) may be true (or 1) and tile_group_reshaper_enable_flag (or slice_reshaper_enable_flag) may be false (or 0). This means that the reshaper model exists but is not used in the current tile group (or the current slice). In this case, the reshaper model can be used in the following tile groups (or slices). As another example, the tile_group_reshaper_enable_flag may be true (or 1) and the tile_group_reshaper_model_present_flag may be false (or 0).

When the reshaper model (eg, tile_group_reshaper_model( ) or slice_reshaper_model( )) and tile_group_reshaper_enable_flag (or slice_reshaper_enable_flag) are parsed, it may be determined (evaluated) whether conditions necessary for chroma scaling exist. The above conditions may include condition 1 (the current tile group/slice is not intra-coded) and/or condition 2 (the current tile group/slice is not split into two separate coding quad tree structures for luma and chroma, i.e. the current tile group/slice is not a dual tree structure). If the condition 1 and/or the condition 2 are true and/or tile_group_reshaper_enable_flag (or slice_reshaper_enable_flag) is true (or 1), then tile_group_reshaper_chroma_residual_scale_flag (or slice_reshaper_chroma_residual_scale_flag) may be parsed. When the tile_group_reshaper_chroma_residual_scale_flag (or slice_reshaper_chroma_residual_scale_flag) is enabled (if 1 or true), it may be indicated that chroma residual scaling is enabled for the current tile group (or the current slice). When the tile_group_reshaper_chroma_residual_scale_flag (or slice_reshaper_chroma_residual_scale_flag) is disabled (if 0 or false), it may be indicated that chroma residual scaling is disabled for the current tile group (or the current slice).

The purpose of the reshaping described above is to parse the data necessary to construct the lookup tables (FwdLUT and/or InvLUT). In an example, the lookup tables constructed based on the parsed data may divide the distribution of the allowable luma value range into a plurality of bins (eg, 16). Accordingly, luma values in given bins may be mapped to changed luma values.

Figure 12:
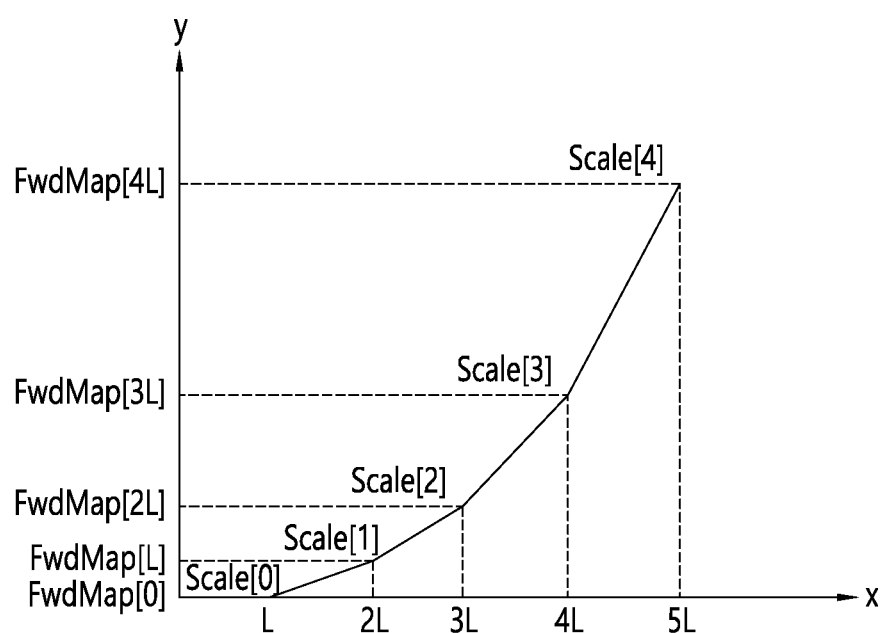
FIG. 12 shows a graph representing an exemplary forward mapping.

FIG. 12 shows a graph illustrating an exemplary forward mapping. In FIG. 12, only five bins are illustrated by way of example.

Referring to FIG. 12, the x-axis represents input luma values, and the y-axis represents changed output luma values. The x-axis is divided into 5 bins or pieces, each bin of length L. That is, the five bins mapped to the changed luma values have the same length. The forward lookup table (FwdLUT) may be constructed using data (eg, reshaper data) available in the tile group header, from which mapping may be facilitated.

In an embodiment, output pivot points associated with the bin indices may be calculated. The output pivot points may set (mark) the minimum and maximum boundaries of the output range of the luma codeword reshaping. The process of calculating the output pivot points may be performed based on a piecewise cumulative distribution function of the number of codewords. The output pivot range may be divided based on the maximum number of bins to be used and the size of the lookup table (FwdLUT or InvLUT). As an example, the output pivot range may be divided based on a product between the maximum number of bins and the size of the lookup table. For example, if the product between the maximum number of bins and the size of the lookup table is 1024, the output pivot range may be divided into 1024 entries. The division of the output pivot range may be performed (applied or achieved) based on (using) a scaling factor. In one example, the scaling factor may be derived based on Equation 3 below.

$$SF = (y2-y1) * (1 << FP\_PREC) + c \quad \text{[Equation 3]}$$

In Equation 3, SF denotes a scaling factor, and y1 and y2 denote output pivot points corresponding to respective bins. Also, FP_PREC and c may be predetermined constants. The scaling factor determined based on Equation 3 may be referred to as a scaling factor for forward reshaping.

In another embodiment, with respect to inverse reshaping (inverse mapping), for a defined range of bins (eg, reshaper_model_min_bin_idx to reshape_model_max_bin_idx), the input reshaped pivot points corresponding to the mapped pivot points of the forward lookup table (FwdLUT) and the mapped inverse output pivot points (given as empty index*number of initial codewords) are fetched. In another example, the scaling factor SF may be derived based on Equation 4 below.

$$SF = (y2-y1) * (1 << FP\_PREC) / (x2-x1) \quad \text{[Equation 4]}$$

In Equation 4, SF denotes a scaling factor, x1 and x2 denote input pivot points, and y1 and y2 denote output pivot points corresponding to each piece (bin). Here, the input pivot points may be pivot points mapped based on a forward lookup table (FwdLUT), and the output pivot points may be pivot points mapped inverse based on an inverse lookup table (InvLUT). Also, FP_PREC may be a predetermined constant. FP_PREC of Equation 4 may be the same as or different from FP_PREC of Equation 3. The scaling factor determined based on Equation 4 may be referred to as a scaling factor for inverse reshaping. During the inverse reshaping, division of input pivot points may be performed based on the scaling factor of Equation 4. Based on the partitioned input pivot points, pivot values corresponding to minimum and maximum bin values for bin indices ranging from 0 to minimum bin index (reshaper_model_min_bin_idx) and/or from minimum bin index (reshaper_model_min_bin_idx) to maximum bin index (reshape_model_max_bin_idx) are specified.

Table 19 below shows the syntax of the reshaper model according to an embodiment. The reshaper model may be referred to as an LMCS model. Here, the reshaper model has been exemplarily described as a tile group reshaper, but the present specification is not necessarily limited by this embodiment. For example, the reshaper model may be included in the APS, or the tile group reshaper model may be referred to as a slice reshaper model.

TABLE 19

| | Descriptor |
|---|---|
| tile_group_reshaper_model ( ) { | |
|   reshaper_model_min_bin_idx | ue(v) |
|   reshaper_model_delta_max_bin_idx | ue(v) |
|   reshaper_model_bin_delta_abs_cw_prec_minus1 | ue(v) |
|   for ( i = reshaper_model_min_bin_idx; i <= reshaper_model_max_bin_idx, i++ ) { | |
|     reshaper_model_bin_delta_abs_CW [ i ] | u(v) |
|     if ( reshaper_model_bin_delta_abs_CW[ i ] ) > 0 ) | |
|       reshaper_model_bin_delta_sign_CW_flag[ i ] | u(1) |
|   } | |
| } | |

The semantics of syntax elements included in the syntax of Table 19 may include, for example, matters disclosed in the following table.

TABLE 20 reshape_model_min_bin_idx specifies the minimum bin (or piece) index to be used in the reshaper construction process. The value of reshape_model_min_bin_idx shall be in the range of 0 to MaxBinIdx, inclusive. The value of MaxBinIdx shall be equal to 15.

reshape_model_delta_max_bin_idx specifies the maximum allowed bin (or piece) index MaxBinIdx minus the maximum bin index to be used in the reshaper construction process. The value of reshape_model_max_bin_idx is set equal to MaxBinIdx
− reshape_model_delta_max_bin_idx.

reshaper_model_bin_delta_abs_cw_prec_minus1 plus 1 specifies the number of bits used for the representation of the syntax reshape_model_bin_delta_abs_CW[ i ].

reshape_model_bin_delta_abs_CW[ i ] specifies the absolute delta codeword value for the ith bin.

reshaper_model_bin_delta_sign_CW_flag[ i ] specifies the sign of reshape_model_bin_delta_abs_CW[ i ] as follows:
- If reshape_model_bin_delta_sign_CW_flag[ i ] is equal to 0, the corresponding variable RspDeltaCW[ i ] is a positive value.
- Otherwise ( reshape_model_bin_delta_sign_CW_flag[ i ] is not equal to 0 ), the corresponding variable RspDeltaCW[ i ] is a negative value.

When reshape_model_bin_delta_sign_CW_flag[ i ] is not present, it is inferred to be equal to 0.

The reshaper model includes components as reshape_model_min_bin_idx, reshape_model_delta_max_bin_idx, reshaper_model_bin_delta_abs_cw_prec_minus1, reshape_model_bin_delta_abs_CW[i], and reshaper_model_bin_delta_sign_CW as elements. Hereinafter, each component will be described in detail.

reshape_model_min_bin_idx indicates the minimum bin (or fragment) index used in the reshaper configuration process. The value of reshape_model_min_bin_idx may range from 0 to MaxBinIdx. For example, MaxBinIdx may be 15.

In an embodiment, the tile group reshaper model may preferentially parse two indices (or parameters), reshaper_model_min_bin_idx and reshaper_model_delta_max_bin_idx. A maximum bin index (reshaper_model_max_bin_idx) may be derived (determined) based on these two indices. The reshape_model_delta_max_bin_idx may represent that the maximum bin index MaxBinIdx allowed is subtracted from the actual maximum bin index (reshape_model_max_bin_idx) used in the reshaper configuration process. A value of the maximum bin index (reshape_model_max_bin_idx) may range from 0 to MaxBinIdx. For example, MaxBinIdx may be 15. As an example, the value of reshape_model_max_bin_idx may be derived based on Equation 5 below.

$$\text{reshape\_model\_max\_bin\_idx} = \text{MaxBinIdx} - \text{reshape\_model\_delta\_max\_bin\_idx}.\quad\text{[Equation 5]}$$

The maximum bin index (reshape_model_max_bin_idx) may be greater than or equal to the minimum bin index (reshape_model_min_bin_idx). The minimum bin index may be referred to as a minimum allowed bin index or an allowed minimum bin index, and the maximum bin index may also be referred to as a maximum allowed bin index or an allowed maximum bin index.

If the maximum bin index (rehape_model_max_bin_idx) is derived, the syntax element reshaper_model_bin_delta_abs_cw_prec_minus1 may be parsed. The number of bits used to represent the syntax reshape_model_bin_delta_abs_CW[i] may be determined based on reshaper_model_bin_delta_abs_cw_prec_minus1. For example, the number of bits used to represent reshape_model_bin_delta_abs_CW[i] may be the same as adding 1 to reshaper_model_bin_delta_abs_cw_prec_minus1.

reshape_model_bin_delta_abs_CW[i] may indicate information related to the absolute delta codeword value (absolute value of the delta codeword) of the i-th bin. In one example, if the absolute delta codeword value of the i-th bin is greater than 0, reshaper_model_bin_delta_sign_CW_flag[i] may be parsed. A sign of reshape_model_bin_delta_abs_CW[i] may be determined based on reshaper_model_bin_delta_sign_CW_flag[i]. In one example, if reshaper_model_bin_delta_sign_CW_flag[i] is 0 (or false), the corresponding variable RspDeltaCW[i] may be a positive sign. In other cases (if reshaper_model_bin_delta_sign_CW_flag[i] is not 0, if reshaper_model_bin_delta_sign_CW_flag[i] is 1 (or true)), the corresponding variable RspDeltaCW[i] may be a negative sign. If reshape_model_bin_delta_sign_CW_flag[i] does not exist, it may be inferred as 0 (or false).

In an embodiment, the variable RspDeltaCW[i] may be derived based on reshape_model_bin_delta_abs_CW[i] and reshape_model_bin_delta_sign_CW_flag[i] described above. RspDeltaCW[i] may be referred to as a value of a delta codeword. For example, RspDeltaCW[i] may be derived based on Equation 6 below.

$$\text{RspDeltaCW}[i] = (1 - 2 \cdot \text{reshape\_model\_bin\_delta\_sign\_CW}[i]) \cdot \text{reshape\_model\_bin\_delta\_abs\_CW}[i]\quad\text{[Equation 6]}$$

In Equation 6, reshape_model_bin_delta_sign_CW[i] may be information related to a sign of RspDeltaCW[i]. For example, reshape_model_bin_delta_sign_CW[i] may be the same as reshaper_model_bin_delta_sign_CW_flag[i] described above. Here, i may be in a range from the minimum bin index (reshaper_model_min_bin_idx) to the maximum bin index (reshape_model_max_bin_idx).

A variable (or array) RspCW[i] may be derived based on RspDeltaCW[i]. Here, RspCW[i] may represent the number of codewords allocated (distributed) to the i-th bin. That is, the number of codewords allocated (distributed) to each bin may be stored in an array form. In one example, if i is smaller than the aforementioned reshaper_model_min_bin_idx or greater than reshape_model_max_bin_idx, (i<reshaper_model_min_bin_idx or reshaper_model_max_bin_idx<i), RspCW[i] may be 0. Otherwise (if i is greater than or equal to reshaper_model_min_bin_idx described above and less than or equal to reshaper_model_max_bin_idx, (reshaper_model_min_bin_idx<=i<=reshaper_model_max_bin_idx), RspCW[i] may be derived based on the above-described RspDeltaCW[i], luma bit depth (BitDepthY), and/or MaxBinIdx. In this case, for example, RspCW[i] may be derived based on Equation 7 below.

$$\text{RspCW}[i] = \text{OrgCW} + \text{RspDeltaCW}[i]\quad\text{[Equation 7]}$$

In Equation 7, OrgCW may be a predetermined value, for example, may be determined based on Equation 8 below.

$$\text{OrgCW} = (1 << \text{BitDepth}_Y) / \text{MaxBinIdx} + 1)\quad\text{[Equation 8]}$$

In Equation 8, BitDepthY is the luma bit depth, and MaxBinIdx represents the maximum allowable bin index. In one example, if BitDepthY is 10, RspCW[i] may have a value from 32 to 2*OrgCW-1.

A variable InputPivot[i] may be derived based on the above-described OrgCW. For example, InputPivot[i] may be derived based on Equation 9 below.

$$\text{InputPivot}[i] = i \cdot \text{OrgCW}\quad\text{[Equation 9]}$$

Variables ReshapePivot[i], ScaleCoef[i], and/or InvScaleCoeff[i] may be derived based on the above-described RspCW[i], InputPivot[i], and/or OrgCW, for example, ReshapePivot[i]], ScaleCoef[i], and/or InvScaleCoeff[i] may be derived based on Table 21 below.

TABLE 21

```
shiftY = 14
ReshapePivot[ 0 ] = 0;
for( i = 0; i <= MaxBinIdx ; i++) {
    ReshapePivot[ i + 1 ] = ReshapePivot[ i ] + RspCW[ i ]
    ScaleCoef[ i ] = ( RspCW[ i ] * (1 << shiftY) + (1 << (Log2(OrgCW) – 1))) >>
(Log2(OrgCW))
```

TABLE 21-continued

```
  if ( RspCW[ i ] == 0 )
     InvScaleCoeff[ i ] = 0
  else
     InvScaleCoeff[ i ] = OrgCW * (1 << shiftY) / RspCW[ i ]
}
```

In Table 21, a for loop syntax in which i increases from 0 to MaxBinIdx may be used, and shiftY may be a predetermined constant for bit shifting. Whether InvScaleCoeff[i] is derived based on RspCW[i] may be determined based on a conditional clause according to whether RspCW[i] is 0.

ChromaScaleCoef[i] for deriving the chroma residual scaling factor may be derived based on Table 22 below.

TABLE 22

ChromaResidualScaleLut[64] {16384, 16384, 16384, 16384, 16384, 16384, 16384,
8192, 8192, 8192, 8192, 5461, 5461, 5461, 5461, 4096, 4096, 4096, 4096, 3277, 3277,
3277, 3277, 2731, 2731, 2731, 2731, 2341, 2341, 2341, 2048, 2048, 2048, 1820, 1820,
1820, 1638, 1638, 1638, 1489, 1489, 1489, 1489, 1365, 1365, 1365, 1365, 1260,
1260, 1260, 1260, 1170, 1170, 1170, 1170, 1092, 1092, 1092, 1092, 1024, 1024, 1024,
1024};
shiftC 11
  if ( RspCW[ i ] == 0 )
     ChromaScaleCoef [ i ] = (1 << shiftC)
  Otherwise (RspCW[ i ] != 0),
     ChromaScaleCoef[ i ] ChromaResidualScaleLut[RspCW[ i ] >> 1]

In Table 22, shiftC may be a predetermined constant for bit shifting. Referring to Table 22, whether ChromaScaleCoef[i] is derived based on the array ChromaResidualScaleLut may be determined based on a conditional clause according to whether RspCW[i] is 0. Here, ChromaResidualScaleLut may be a predetermined array. However, the array ChromaResidualScaleLut is merely exemplary, and the present embodiment is not necessarily limited by Table 22.

A method for deriving the i-th variables has been described above. The i+1-th variables may be based on ReshapePivot[i+1], and for example, ReshapePivot[i+1] may be derived based on Equation 10.

$$ReshapePivot[i+1]=ReshapePivot[i]+RspCW[i]$$ [Equation 10]

In Equation 10, RspCW[i] may be derived based on Equations 7 and/or 8 described above. Luma mapping may be performed based on the above-described embodiments and examples, and the above-described syntax and components included therein may be merely exemplary representations, and embodiments are not limited by the above-mentioned tables or equations. Hereinafter, a method of performing chroma residual scaling (scaling of chroma components of residual samples) based on luma mapping will be described.

The (luma-dependent) chroma residual scaling is to compensate for a difference between luma samples and corresponding chroma samples. For example, whether chroma residual scaling is enabled may be signaled at a tile group level or a slice level. In one example, if the luma mapping is enabled and dual tree partitioning is not applied to the current tile group, an additional flag may be signaled to indicate whether the luma-dependent chroma residual scaling is enabled. In another example, the luma-dependent chroma residual scaling may be disabled if the luma mapping is not used, or if dual tree partitioning is not used for the current tile group. In another example, the chroma residual scaling may always be disabled for chroma blocks having a size less than or equal to 4.

The chroma residual scaling may be performed based on an average luma value of reference samples. For example, the reference samples may include samples of a corresponding luma prediction block (the luma components of a prediction block to which the intra prediction and/or the inter prediction is applied). When the inter prediction is applied, the reference samples may include samples after forward mapping is applied to the luma component prediction samples. Alternatively, the reference samples may include neighboring samples of the current block or neighboring samples of a VPDU including the current block. In this case, when the inter prediction is applied to the neighboring block including the neighboring samples, the neighboring samples may include luma component reconstruction samples derived based on the luma component prediction samples to which the forward mapping of the neighboring block is applied. Scaling operations at the encoder side and/or the decoder side may be implemented as, for example, fixed-point integer calculations based on Equation 11 below.

$$c' \quad \text{sign}(c)*((\text{abs}(c)*s\cdot 2\text{CSCALE\_FP\_PRFC}-1)>>\text{CSCALE\_FP\_PRFC})$$ [Equation 11]

In Equation 11 above, c' denotes a scaled chroma residual sample (scaled chroma component of a residual sample), c denotes a chroma residual sample (chroma component of the residual sample), s may represent a chroma residual scaling factor, and CSCALE_FP_PREC may represent a predetermined constant.

As described above, an average luma value of the reference samples may be obtained, and the chroma residual scaling factor may be derived based on the average luma value. As described above, the chroma component residual samples may be scaled based on the chroma residual scaling factor, and the chroma component reconstruction samples may be generated based on the scaled chroma component residual samples.

An embodiment of this document proposes a signaling structure for efficiently applying the above-described ALF and/or LMCS. According to an embodiment of the present document, for example, ALF data and/or LMCS data may be included in HLS (eg, APS), by signaling the referenced APS ID through the header information (ex. picture header, slice header) that is a lower level of the APS, a filter for the ALF and/or LMCS model (reshaper model) can be adaptively derived. The LMCS model may be derived based on LMCS parameters. Also, for example, a plurality of APS IDs may be signaled through the header information, and through this, different ALF and/or LMCS models may be applied in units of blocks within the same picture/slice.

For example, the following table shows an example of header information according to an embodiment.

TABLE 23

| | Descriptor |
|---|---|
| slice_header( ){ | |
| ... | |
| if( sps_alf_enabled_flag ) { | |
|   slice_alf_enabled_flag | u(1) |
|   if( slice_alf_enabled_flag ) { | |
|     num_alf_aps_ids_minus1 | ue(v) |
|     for( i = 0; i <= num_alf_aps_ids_minus1; i++ ) | |

TABLE 23-continued

| | Descriptor |
|---|---|
|       slice_alf_aps_id[ i ] | u(5) |
|     } | |
|   } | |
| ... | |
| if( sps_lmcs_enabled_flag ) { | |
|   slice_lmcs_enabled_flag | |
|   if( slice_lmcs_enabled_flag ) { | |
|     slice_lmcs_aps_id | |
|     if( !( qtbtt_dual_tree_intra_flag && slice_type = = I ) ) | |
|       slice_chroma_residual_scale_flag | |
|   } | |
| if ( entropy_coding_sync_enabled_flag ) | |
|   num_entry_point_offsets | ue(v) |
|   if( NumEntryPoint > 0 ) { | |
|     offset_len_minus1 | ue(v) |
|     for( i = 0; i < NumEntryPoint; i-+ ) | |
|       entry_point_offset_minus1[ i ] | u(v) |
|   } | |
|   byte_alignment( ) | |
| } | |

Semantics of syntax elements included in the syntax of Table 23 may include, for example, matters disclosed in the following table.

TABLE 24 num_alf_aps_ids_minus1 plus 1 specifies the number of ALF APSs that the slice refers to. The value of num_alf_aps_ids_minus1 shall be in the range of 0 to 7, inclusive
slice_alf_aps_id[ i ] specifies the adaptation_parameter_set_id of the i-th ALF APS that the slice refers to. The TemporalId of the ALF APS NAL unit having adaptation_parameter_set_id equal to slice_alf_aps_id[ i ] shall be less than or equal to the TemporalId of the coded slice NAL unit.
slice_lmcs_enabled_flag equal to 1 specifies that luma mappin with chroma scaling is enabled for the current slice. slice_lmcs_enabled_flag equal to 0 specifies that luma mapping with chroma scaling is not enabled for the current slice. When slice_lmcs_enabled_flag is not present, it is inferred to be equal to 0.
slice_lmcs_aps_id specifies the adaptation_parameter_set_id of the LMCS APS that the slice refers to. The TemporalId of the LMCS APS NAL unit having adaptation_parameter_set_id equal to slice_lmcs_aps_id shall be less than or equal to the TemporalId of the coded slice NAL unit.
When multiple LMCS APSs with the same value of adaptation_parameter_set_id are referred to by two or more slices of the same picture, the multiple LMCS APSs with the same value of adaptation_parameter_set_id shall have the same content.
slice_chroma_residual_scale_flag equal to 1 specifies that chroma residual scaling is enabled for the current slice. slice_chroma_residual_scale_flag equal to 0 specifies that chroma residual scaling is not enabled for the current slice. When slice_chroma_residual_scale_flag is not present, it is inferred to be equal to 0.
num_entry_point_offsets is used to specify the variable NumEntryPoints, which specifies the number of entry points in the current slice as follows:
  NumEntryPoints = entropy_coding_sync_enabled_flag ? num_entry_point_offsets :
    NumBricksInCurrSlice − 1
offset_len_minus1 plus 1 specifies the length, in bits, of the entry_point_offset_minus1[ i ] syntax elements. The value of offset_len_minus1 shall be in the range of 0 to 31, inclusive.
entry_point_offset_minus1[ i ] plus 1 specifies the i-th entry point offset in bytes, and is represented by offset_len_minus1 plus 1 bits. The slice data that follow the slice header consists of NumEntryPoints + 1 subsets, with subset index values ranging from 0 to NumEntryPoints, inclusive. The first byte of the slice data is considered byte 0. When present, emulation prevention bytes that appear in the slice data portion of the coded slice NAL unit are counted as part of the slice data for purposes of subset identification. Subset 0 consists of bytes 0 to entry_point_offset_minus1[ 0 ], inclusive, of the coded slice data, subset k, with k in the range of 1 to NumEntryPoints − 1, inclusive, consists of bytes firstByte[ k ] to lastByte[ k ], inclusive, of the coded slice data with firstByte[ k ] and lastByte[ k ] defined as:
  firstByte[ k ] = $\Sigma_{n-1}^{k}$( entry_point_offset_minus1[ n − 1 ] + 1 )
  lastByte[ k ] = firstByte[ k ] + entry_point_offset_minus1[ k ]
The last subset (with subset index equal to NumEntryPoints) consists of the remaining bytes of the coded slice data.
When entropy_coding_sync_enabled_flag is equal to 0, each subset shall consist of all coded bits of all CTUs in the slice that are within the same brick, and the number of subsets (i.e., the value of NumEntoryPoint + 1) shall be equal to the number of bricks in the slice.
When entropy_coding_sync_enabled_flag is equal to 1, each subset k with k in the range of 0 to NumEntoryPoint, inclusive, shall consist of all coded bits of all CTUs in a CTU row within a brick, and the number of subsets ( i.e., the value of NumEntoryPoint + 1 ) shall be equal to the total number of brick-specific luma CTU rows in the slice.

For example, referring to Table 23, the header information may include ALF-related information. The ALF-related information includes an ALF availability flag syntax element (ex. slice_ALF_enabled_flag), an ALF-related APS ID number syntax element (ex. num_alf_aps_ids_minus1), and ALF-related APS ID syntax elements (ex. slice_alf_aps_id[i]) as many as the number of ALF-related APS IDs derived based on the ALF-related APS ID number syntax element.

In addition, the header information may include LMCS-related information. The LMCS-related information may include, for example, at least one of an LMCS availability flag syntax element (ex. slice_lmcs_enabled_flag), an LMCS-related APS ID syntax element (slice_lmcs_aps_id), and a chroma residual scaling flag syntax element (slice_chroma_residual_scale_flag).

According to this embodiment, a hierarchical control of ALF and/or LMCS is possible.

For example, as described above, the availability of the ALF tool can be determined through the ALF availability flag (ex. sps_alf_enabled_flag) in the SPS, and then whether ALF is available in the current picture or slice may be indicated through an ALF availability flag (eg, slice_alf_enabeld_flag) in the header information. When the value of the ALF availability flag in the header information is 1, ALF-related APS ID number syntax element may be parsed/signaled. In addition, as many the ALF-related APS ID syntax elements as the number of the ALF-related APS IDs derived based on the ALF-related APS ID number syntax elements may be parsed/signaled. That is, this may indicate that multiple APSs can be parsed or referenced through one header information.

Also, for example, it may be determined whether the LMCS (or reshaping) tool is available through an LMCS availability flag (eg sps_reshaper_enabled_flag) in the SPS. The sps_reshaper_enabled_flag may be referred to as sps_lmcs_enabled_flag. Whether LMCS is available in the current picture or slice may be indicated through an LMCS availability flag (eg, slice_lmcs_enabeld_flag) in the header information. When the value of the LMCS availability flag in the header information is 1, LMCS-related APS ID syntax element may be parsed/signaled. The LMCS model (reshaper model) may be derived from the APS indicated by the LMCS-related APS ID syntax element. For example, the APS may further include an LMCS data field, and the LMCS data field may include the above-described LMCS model (reshaper model) information.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 13:
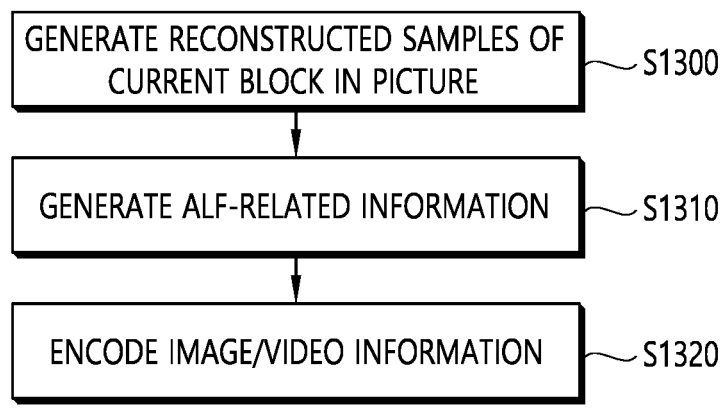
FIG. 13 and FIG. 14 schematically represent an example of a video/image encoding method and related components according to the embodiment(s) of this document.
Figure 14:
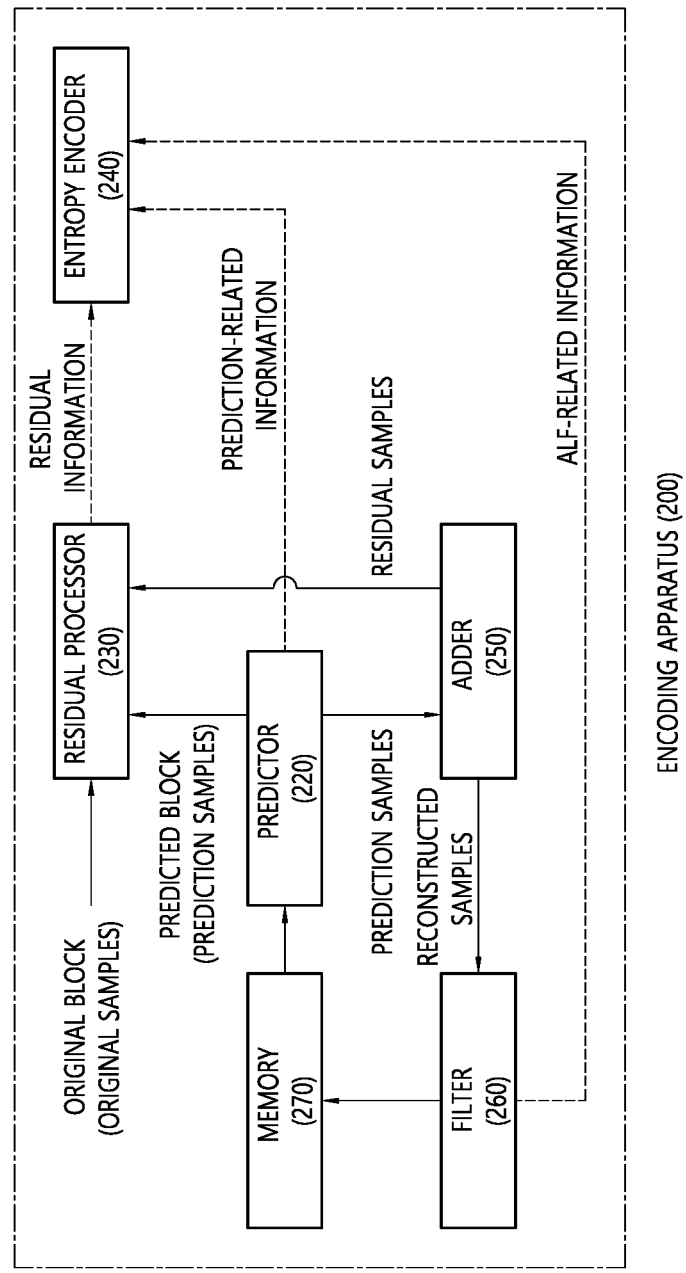

FIG. 13 and FIG. 14 schematically show an example of a video/image encoding method and related components according to embodiment(s) of this document. The method disclosed in FIG. 13 may be performed by the encoding apparatus illustrated in FIG. 2. Specifically, for example, S1300 of FIG. 13 may be performed by the adder 250 of the encoding apparatus, S1310 of FIG. 13 may be performed by the filter 260 of the encoding apparatus, and S1320 of FIG. 13 may be performed by the entropy encoder 240 of the encoding apparatus. The method disclosed in FIG. 13 may include the embodiments described above in this document.

Referring to FIG. 13, the encoding apparatus generates reconstructed samples of the current block in the current picture (S1300). The encoding apparatus may derive prediction samples of the current block based on the prediction mode. In this case, various prediction methods disclosed in this document, such as the inter prediction or the intra prediction, may be applied. Residual samples may be derived based on the prediction samples and the original samples. In this case, residual information may be derived based on the residual samples. Based on the residual information, (modified) residual samples may be derived. Reconstructed samples may be generated based on the (modified) residual samples and the prediction samples. A reconstructed block and a reconstructed picture may be derived based on the reconstructed samples.

The encoding apparatus generates ALF-related information (S1310). The encoding apparatus derives an ALF-related parameter, which can be applied for filtering the reconstructed samples, and generates the ALF-related information. For example, the ALF-related information may include the ALF-related information described above in this document.

The encoding apparatus encodes the image/video information (S1320). The image/video information may include information for generating the reconstructed samples and/or ALF-related information. The information for generating the reconstructed samples may include, for example, prediction-related information, residual information, and/or LMCS-related information. The prediction-related information may include information on various prediction modes (eg, merge mode, MVP mode, etc.), MVD information, and the like.

The encoded image/video information may be output in the form of a bitstream. The bitstream may be transmitted to the decoding apparatus through a network or a storage medium.

The image/video information may include various information according to an embodiment of this document. For example, the image/video information may include information disclosed in at least one of Tables 1, 3, 4, 7, 9, 13, 15, 16, 19, and 23 described above.

For example, the image information may include the aforementioned adaptation parameter set (APS). The APS may include the ALF data, and the ALF data may include information for deriving filter coefficients for the ALF.

The image information may include an SPS, and the SPS may include a first ALF availability flag indicating whether the ALF is available. The image information may include header information. When the value of the first ALF availability flag is 1, the header information may include a second ALF availability flag indicating whether the ALF is available in a picture or a slice.

The header information may include an ALF-related APS ID syntax element, and the APS ID indicated by the ALF-related APS ID syntax element may be the same as the ID of the APS including the ALF data.

The header information may include a picture header or a slice header.

The header information includes the second ALF availability flag indicating whether the ALF is available in the picture or the slice, and when the value of the second ALF availability flag is 1, the header information include the ALF-related APS ID A number syntax element, and the value of the ALF-related APS ID number syntax element plus 1 may be equal to the number of ALF-related APS IDs.

For example, the APS may include LMCS data. The header information may include LMCS-related information. The LMCS-related information may include, for example, at least one of an LMCS availability flag syntax element (ex. slice_lmcs_enabled_flag), an LMCS-related APS ID syntax element (slice_lmcs_aps_id), and a chroma residual scaling flag syntax element (slice_chroma_residual_scale_flag).

Figure 15:
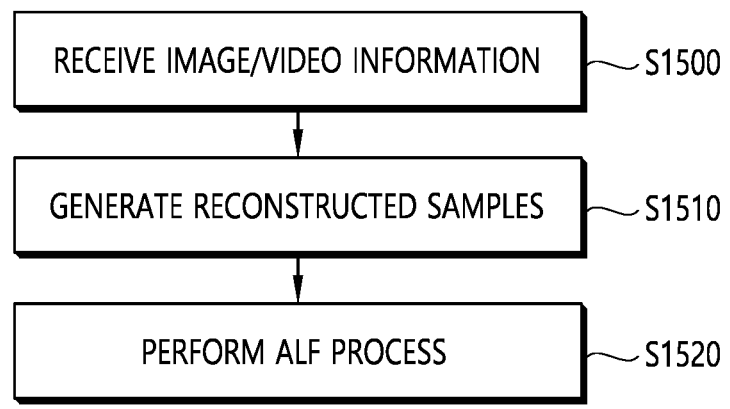
FIG. 15 and FIG. 16 schematically represent an example of a video/image decoding method and related components according to the embodiment(s) of this document.
Figure 16:
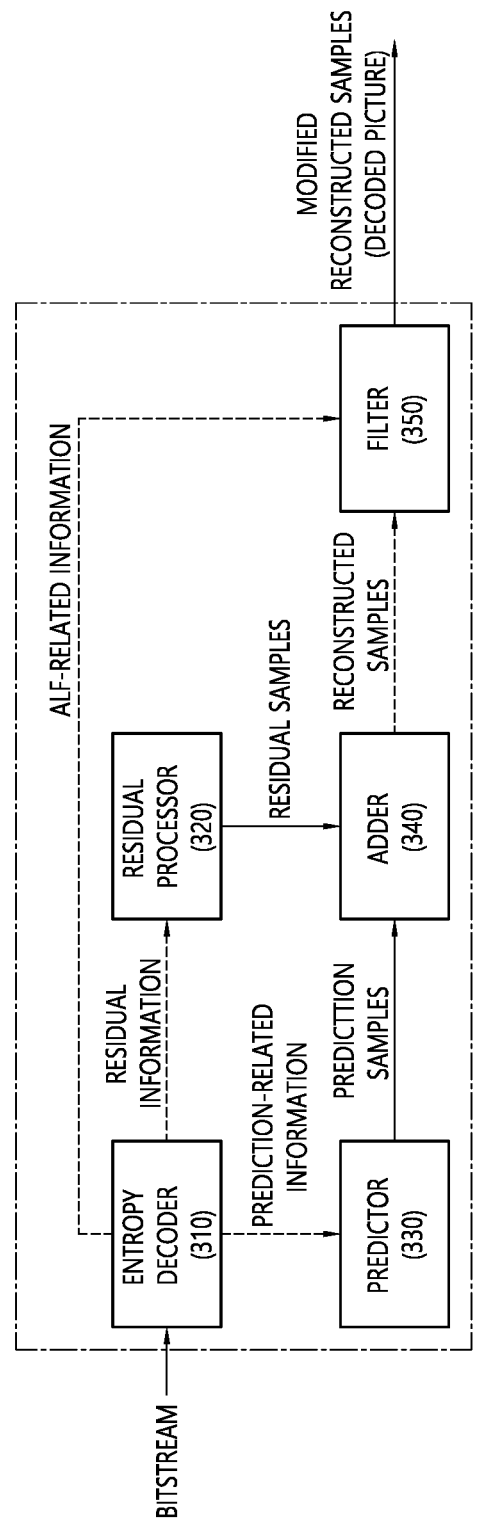

FIG. 15 and FIG. 16 schematically show an example of an image/video decoding method and related components according to an embodiment of this document. The method disclosed in FIG. 15 may be performed by the decoding apparatus disclosed in FIG. 3. Specifically, for example, S1500 of FIG. 15 may be performed by the entropy decoder 310 of the decoding apparatus, S1510 may be performed by the adder 340 of the decoding apparatus, and S1520 is may be performed by the filter 350 of the decoding apparatus. The method disclosed in FIG. 15 may include the embodiments described above in this document.

Referring to FIG. 15, the decoding apparatus receives/obtains image/video information (S1500). The decoding apparatus may receive/obtain the image/video information through a bitstream.

The image/video information may include various information according to an embodiment of this document. For example, the image/video information may include information disclosed in at least one of Tables 1, 3, 4, 7, 9, 13, 15, 16, 19, and/or 23 described above.

The decoding apparatus generates reconstructed samples based on the image/video information (S1510). The decoding apparatus may derive prediction samples of the current block based on prediction-related information included in the image/video information. The decoding apparatus may derive residual samples based on residual information included in the image/video information. The decoding apparatus may generate reconstructed samples based on the prediction samples and the residual samples. A reconstructed block and a reconstructed picture may be derived based on the reconstructed samples.

The decoding apparatus performs an ALF process on the reconstructed samples (S1520). The decoding apparatus may derive filter coefficients for the ALF, and generate modified reconstructed samples based on the reconstructed samples and the filter coefficients. One filter may include a set of filter coefficients. The filter or the filter coefficients may be derived based on the ALF data.

For example, the image information may include the above-described APS (adaptation parameter set). The APS may include the ALF data, and the ALF data may include information for deriving filter coefficients for the ALF.

The image information may include an SPS, and the SPS may include a first ALF availability flag indicating whether the ALF is available. The image information may include header information. When the value of the first ALF availability flag is 1, the header information may include a second ALF availability flag indicating whether the ALF is available in a picture or a slice.

The header information may include an ALF-related APS ID syntax element, and the APS ID indicated by the ALF-related APS ID syntax element may be the same as the ID of the APS including the ALF data.

The header information may include a picture header or a slice header.

The header information includes the second ALF availability flag indicating whether the ALF is available in the picture or the slice, and when the value of the second ALF availability flag is 1, the header information may include the ALF-related APS ID number syntax element. The number of ALF-related APS IDs may be determined based on the value of the ALF-related APS ID number syntax element. This may indicate the number of ALF-related APS ID syntax elements included in the header information. For example, the value of the ALF-related APS ID number syntax element plus 1 may be equal to the number of the ALF-related APS ID syntax elements included in the header information. For example, the ALF data may be included in at least one APS among APS IDs indicated by the ALF-related APS ID syntax elements.

For example, the APS may include LMCS data. The header information may include LMCS-related information. The LMCS-related information may include, for example, at least one of an LMCS availability flag syntax element (ex. slice_lmcs_enabled_flag), an LMCS-related APS ID syntax element (slice_lmcs_aps_id), and a chroma residual scaling flag syntax element (slice_chroma_residual_scale_flag).

Although methods have been described on the basis of a flowchart in which steps or blocks are listed in sequence in the above-described embodiments, the steps of the embodiments are not limited to a certain order, and a certain step may be performed in a different step or in a different order or concurrently with respect to that described above. Further, it will be understood by those ordinary skilled in the art that the steps of the flowcharts are not exclusive, and another step may be included therein or one or more steps in the flowchart may be deleted without exerting an influence on the scope of the embodiments of the present document.

The aforementioned method according to the embodiments of the present document may be in the form of software, and the encoding apparatus and/or decoding apparatus according to the present document may be included in a device for performing image processing, for example, a TV, a computer, a smart phone, a set-top box, a display device, or the like.

When the embodiments are implemented in software in the present document, the aforementioned method may be implemented using a module (procedure, function, etc.) which performs the aforementioned function. The module may be stored in a memory and executed by a processor. The memory may be disposed to the processor internally or externally and connected to the processor using various well-known means. The processor may include application-specific integrated circuit (ASIC), other chipsets, logic circuits, and/or data processors. The memory may include a read-only memory (ROM), a random access memory (RAM), a flash memory, a memory card, storage media and/or other storage devices. That is, the embodiments described herein may be implemented and performed on a processor, a microprocessor, a controller, or a chip. For example, the functional units shown in each drawing may be implemented and performed on a computer, a processor, a microprocessor, a controller, or a chip. In this case, information for implementation (e.g., information on instructions) or an algorithm may be stored in a digital storage medium.

Further, the decoding apparatus and the encoding apparatus to which the embodiment(s) of the present document is applied may be included in a multimedia broadcasting transceiver, a mobile communication terminal, a home cinema video device, a digital cinema video device, a surveillance camera, a video chat device, and a real time communication device such as video communication, a mobile streaming device, a storage medium, camcorder, a video on demand (VoD) service provider, an over the top video (OTT) device, an internet streaming service provider, a 3D video device, a virtual reality (VR) device, an augment reality (AR) device, an image telephone video device, a vehicle terminal (e.g., a vehicle (including an autonomous vehicle) terminal, an airplane terminal, a ship terminal, etc.) and a medical video device, and the like, and may be used to process a video signal or a data signal. For example, the OTT video device may include a game console, a Blu-ray player, an Internet-connected TV, a home theater system, a smartphone, a tablet PC, a digital video recorder (DVR), and the like.

Further, the processing method to which the embodiment(s) of the present document is applied may be produced in the form of a program being executed by a computer and may be stored in a computer-readable recording medium. Multimedia data having a data structure according to the embodiment(s) of the present document may also be stored in the computer-readable recording medium. The computer readable recording medium includes all kinds of storage devices and distributed storage devices in which computer readable data is stored. The computer-readable recording medium may be, for example, a Blu-ray disc (BD), a universal serial bus (USB), a ROM, a PROM, an EPROM, an EEPROM, a RAM, a CD-ROM, a magnetic tape, a floppy disk, and an optical data storage device. The computer-readable recording medium also includes media embodied in the form of a carrier wave (e.g., transmission over the Internet). Further, a bitstream generated by the encoding method may be stored in the computer-readable recording medium or transmitted through a wired or wireless communication network.

In addition, the embodiment(s) of the present document may be embodied as a computer program product based on a program code, and the program code may be executed on a computer by the embodiment(s) of the present document. The program code may be stored on a computer-readable carrier.

Figure 17:
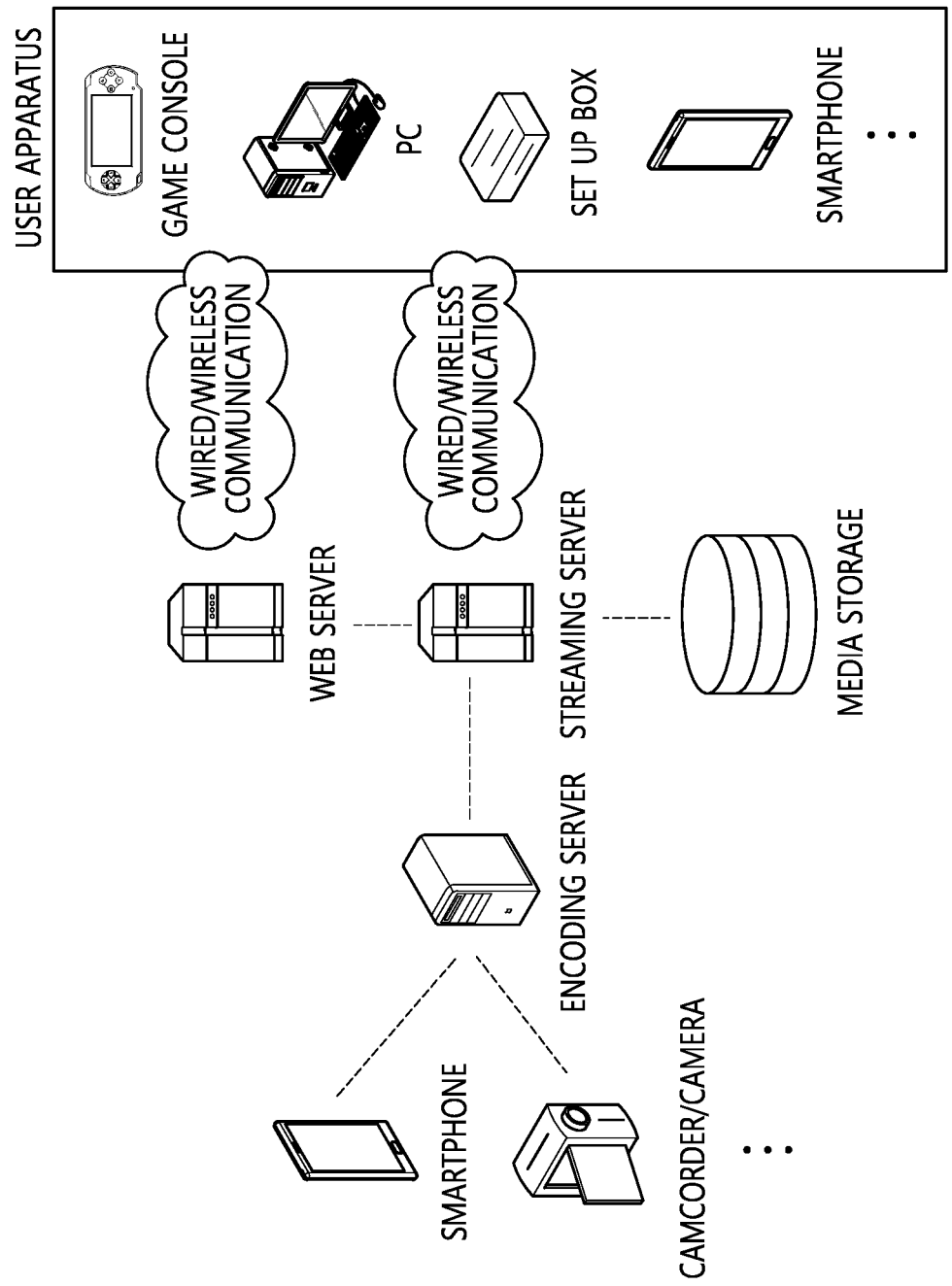
FIG. 17 illustratively represents a content streaming system structure diagram to which the present disclosure is applied.

FIG. 17 represents an example of a content streaming system to which the embodiments described in the present document may be applied.

Referring to FIG. 17, the content streaming system to which the embodiments of the present document are applied may generally include an encoding server, a streaming server, a web server, a media storage, a user device, and a multimedia input device.

The encoding server functions to compress to digital data the contents input from the multimedia input devices, such as the smart phone, the camera, the camcorder and the like, to generate a bitstream, and to transmit it to the streaming server. As another example, in a case where the multimedia input device, such as, the smart phone, the camera, the camcorder or the like, directly generates a bitstream, the encoding server may be omitted.

The bitstream may be generated by an encoding method or a bitstream generation method to which the embodiments of the present document are applied. And the streaming server may temporarily store the bitstream in a process of transmitting or receiving the bitstream.

The streaming server transmits multimedia data to the user equipment on the basis of a user's request through the web server, which functions as an instrument that informs a user of what service there is. When the user requests a service which the user wants, the web server transfers the request to the streaming server, and the streaming server transmits multimedia data to the user. In this regard, the content streaming system may include a separate control server, and in this case, the control server functions to control commands/responses between respective equipment in the content streaming system.

The streaming server may receive contents from the media storage and/or the encoding server. For example, in a case the contents are received from the encoding server, the contents may be received in real time. In this case, the streaming server may store the bitstream for a predetermined period of time to provide the streaming service smoothly.

For example, the user equipment may include a mobile phone, a smart phone, a laptop computer, a digital broadcasting terminal, a personal digital assistant (PDA), a portable multimedia player (PMP), a navigation, a slate PC, a tablet PC, an ultrabook, a wearable device (e.g., a watch-type terminal (smart watch), a glass-type terminal (smart glass), a head mounted display (HMD)), a digital TV, a desktop computer, a digital signage or the like.

Each of servers in the content streaming system may be operated as a distributed server, and in this case, data received by each server may be processed in distributed manner. The claims described herein may be combined in various ways. For example, the technical features of the method claims of the present specification may be combined and implemented as an apparatus, and the technical features of the apparatus claims of the present specification may be combined and implemented as a method. In addition, the technical features of the method claims of the present specification and the technical features of the apparatus claims may be combined to be implemented as an apparatus, and the technical features of the method claims and the technical features of the apparatus claims of the present specification may be combined and implemented as a method.

What is claimed is:

1. An image decoding method performed by a decoding apparatus, the method comprising:
   obtaining image information from a bitstream;
   generating reconstructed samples of a current block based on the image information; and
   performing an adaptive loop filter (ALF) on the reconstructed samples,
   wherein the performing the ALF comprising:
   deriving filter coefficients for the ALF; and
   generating modified reconstructed samples based on the reconstructed samples and the filter coefficients,
   wherein the image information comprises an adaptation parameter set (APS),
   wherein the APS comprises ALF data,
   wherein the filter coefficients are derived based on the ALF data,
   wherein the image information comprises header information,
   wherein the header information includes multiple ALF related APS ID syntax elements,
   wherein the header information includes an ALF related APS IDs number syntax element,
   wherein an ALF related APS IDs number is derived based on a value of the ALF related APS IDs number syntax element, and
   wherein the multiple ALF related APS ID syntax elements as many as the ALF related APS IDs number are included in the header information.

2. The method of claim 1, wherein the image information comprises an SPS, and
   wherein the SPS includes a first ALF enabled flag representing whether the ALF is enabled.

3. The method of claim 2, wherein based on a value of the first ALF enabled flag being equal to 1, the header information includes a second ALF enabled flag representing whether the ALF is enabled in a slice.

4. The method of claim 1, wherein an APS ID represented by one of the multiple ALF related APS ID syntax elements is equal to an ID of the APS comprising the ALF data.

5. The method of claim 1, wherein the header information is for a slice header.

6. The method of claim 1, wherein the header information includes a second ALF enabled flag representing whether the ALF is enabled in a slice,
wherein based on a value of the second ALF enabled flag is equal to 1, the header information includes the ALF related APS IDs number syntax element, and
wherein the value of the ALF related APS IDs number syntax element plus 1 is equal to the ALF related APS IDs number.

7. An image encoding method performed by an encoding apparatus, the method comprising:
generating reconstructed samples of a current block in a current picture;
generating an adaptive loop filter (ALF) related information for the reconstructed samples;
encoding image information including information for generating the reconstructed samples and the ALF related information,
wherein the image information comprises an adaptation parameter set (APS),
wherein the APS comprises ALF data,
wherein the ALF data includes information for deriving filter coefficients for an ALF,
wherein the image information comprises header information,
wherein the header information includes multiple ALF related APS ID syntax elements,
wherein the header information includes an ALF related APS IDs number syntax element for signaling an ALF related APS IDs number, and
wherein the multiple ALF related APS ID syntax elements as many as the ALF related APS IDs number are included in the header information.

8. The method of claim 7, wherein the image information comprises an SPS, and
wherein the SPS includes a first ALF enabled flag representing whether the ALF is enabled.

9. The method of claim 8, wherein based on a value of the first ALF enabled flag being equal to 1, the header information includes a second ALF enabled flag representing whether the ALF is enabled in a picture or a slice.

10. The method of claim 7, wherein an APS ID represented by one of the multiple ALF related APS ID syntax elements is equal to an ID of the APS comprising the ALF data.

11. The method of claim 7, wherein the header information is for a slice header.

12. The method of claim 7, wherein the header information includes a second ALF enabled flag representing whether the ALF is enabled in a slice,
wherein based on a value of the second ALF enabled flag is equal to 1, the header information includes the ALF related APS IDs number syntax element, and
wherein the value of the ALF related APS IDs number syntax element plus 1 is equal to the ALF related APS IDs number.

13. A non-transitory computer-readable storage medium storing a bitstream generated by a method, the method comprising:
generating reconstructed samples of a current block in a current picture;
generating an adaptive loop filter (ALF) related information for the reconstructed samples;
encoding image information to generate the bitstream, wherein the image information includes information for generating the reconstructed samples and the ALF related information,
wherein the image information comprises an adaptation parameter set (APS),
wherein the APS comprises ALF data,
wherein the ALF data includes information for deriving filter coefficients for an ALF,
wherein the image information comprises header information,
wherein the header information includes multiple ALF related APS ID syntax elements,
wherein the header information includes an ALF related APS IDs number syntax element for signaling an ALF related APS IDs number, and
wherein the multiple ALF related APS ID syntax elements as many as the ALF related APS IDs number are included in the header information.

* * * * *